United States Patent [19]
Eickmann

[11] Patent Number: 4,896,564
[45] Date of Patent: Jan. 30, 1990

[54] AXIAL PISTON MOTOR OR PUMP WITH AN ARRANGEMENT TO THRUST THE ROTOR AGAINST A SHOULDER OF THE SHAFT

[76] Inventor: Karl Eickmann, 2420 Isshiki, Hayama-machi, Kanagawa-ken, Japan

[21] Appl. No.: 4,018

[22] Filed: Jan. 16, 1987

Related U.S. Application Data

[63] Continuation-in-part of Ser. No. 678,540, Dec. 5, 1984, Pat. No. 4,664,018, and a continuation-in-part of Ser. No. 387,567, Jun. 11, 1982, abandoned, and a continuation-in-part of Ser. No. 521,874, Aug. 10, 1983, abandoned, said Ser. No. 387,567, continuation of Ser. No. 954,555, and a continuation of Ser. No. 122,914, and a continuation of Ser. No. 282,990, said Ser. No. 521,874, continuation of Ser. No. 64,248.

[51] Int. Cl.[4] .......... F16H 37/06; F16H 47/04; F01B 1/00; B60K 17/356

[52] U.S. Cl. .......... 74/682; 74/687; 91/485; 91/488; 180/243; 180/308

[58] Field of Search .......... 91/485, 488; 180/53.4, 180/243, 308; 74/682, 687, 677, 664, 665 R, 720, 705

[56] References Cited

U.S. PATENT DOCUMENTS

| | | | |
|---|---|---|---|
| 2,299,235 | 6/1937 | Snader et al. | 91/488 |
| 2,483,856 | 10/1949 | Temple | 91/488 |
| 2,844,104 | 7/1958 | Wennberg | 91/485 |
| 2,897,688 | 8/1959 | Graybill | 74/682 |
| 2,996,135 | 8/1961 | Grabow | 180/308 |
| 3,011,453 | 12/1961 | Budzich | 91/488 |
| 3,016,777 | 1/1962 | Hornbostel | 74/687 |
| 3,055,233 | 9/1962 | Giles | 74/687 |
| 3,073,253 | 1/1963 | Schöllhammer | 91/485 |
| 3,079,870 | 3/1963 | Thoma | 91/485 |
| 3,092,036 | 5/1960 | Creighton | 91/485 |
| 3,132,534 | 5/1964 | Boehner | 74/687 |
| 3,143,006 | 8/1964 | Kratochvil | 74/705 |
| 3,212,358 | 10/1965 | De Lalio | 74/687 |
| 3,255,673 | 6/1966 | Thoma | 91/485 |
| 3,286,543 | 11/1966 | Porter | 74/687 |
| 3,470,769 | 10/1969 | Livezey | 74/687 |
| 3,495,542 | 2/1970 | Kratzenberg et al. | 91/485 |
| 3,620,130 | 11/1971 | Roberts | 91/506 |
| 3,956,972 | 5/1976 | Clerk | 91/485 |
| 3,969,957 | 7/1976 | De Lalio | 74/687 |
| 3,979,915 | 9/1976 | KronogÅrd | 180/53.4 |
| 4,183,264 | 1/1980 | Reed | 74/687 |
| 4,213,514 | 7/1980 | Ehrlinger et al. | 180/308 |
| 4,345,488 | 8/1982 | Reed | 74/682 |
| 4,353,269 | 10/1982 | Hiersig | 74/682 |
| 4,420,991 | 12/1983 | Meyerle | 74/682 |
| 4,454,802 | 6/1984 | Cailliau et al. | 92/172 |
| 4,548,098 | 10/1985 | Besson et al. | 74/682 |
| 4,557,347 | 12/1985 | Eickmann | 180/308 |
| 4,699,021 | 10/1987 | Waddington | 74/687 |
| 4,723,477 | 2/1988 | Eickmann | 91/485 |
| 4,793,239 | 12/1988 | Eickmann | 91/485 |

FOREIGN PATENT DOCUMENTS

| | | | |
|---|---|---|---|
| 1153268 | 8/1963 | Fed. Rep. of Germany | 180/308 |
| 0094054 | 7/1980 | Japan | 74/677 |
| 0102849 | 6/1983 | Japan | 74/687 |

*Primary Examiner*—Rodney H. Bonck
*Assistant Examiner*—Harold F. Macris

[57] ABSTRACT

In an axial piston motor or pump the cylinder barrel is mounted on a medial shaft which has a shoulder which axially bears against the front end of the rotor barrel. The rear end of the medial shaft is radially borne in a housing portion. The front portion of the medial shaft is provided with a bearing member of an axial thrust bearing for support on a respective axial thrust bearing member in the housing. On the rear end of the rotary barrel an axially selfthrusting control body is provided to seal the flow of fluid to and from the cylinders of the rotary barrel. The control body presses against the rotary barrel, the rotary barrel presses against the shoulder of the medial shaft and the thrust bearing member of the shaft bears on the thrust bearing member of the housing. As a result thereof the cylinders in the rotary barrel can be straight through bores. The manufacturing of the rotor barrel is thereby simplified and the flow acceleration losses of former bore type cylinders are prevented.

6 Claims, 7 Drawing Sheets

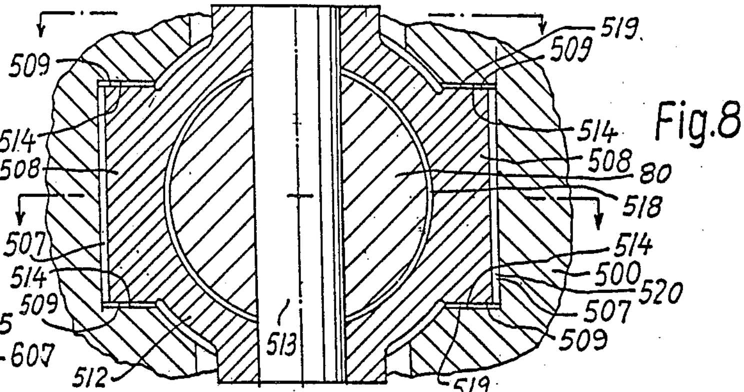
Fig. 8
Fig. 9
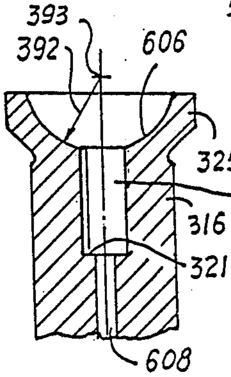
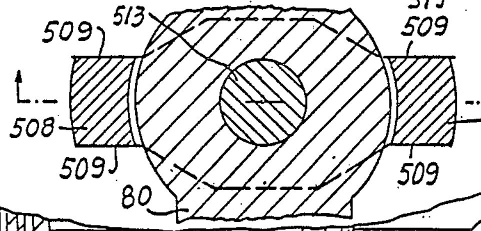
Fig. 7
Fig. 6
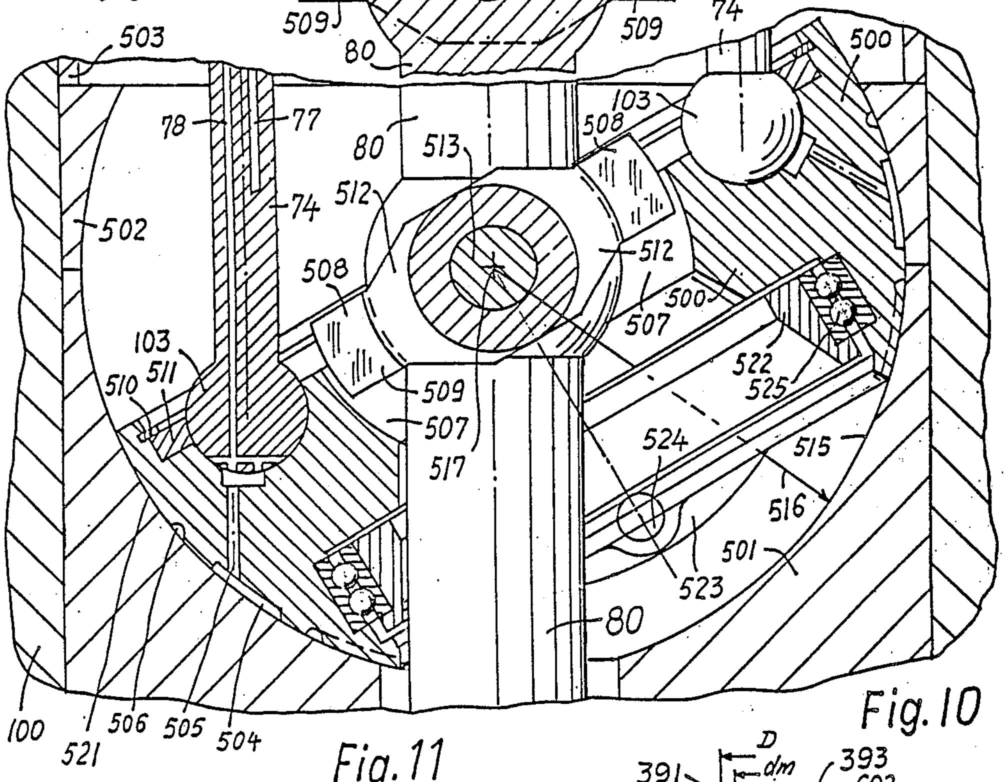
Fig. 11
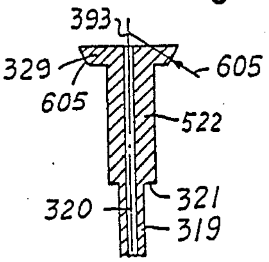
Fig. 10
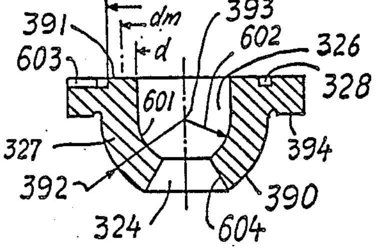

AXIAL PISTON MOTOR OR PUMP WITH AN ARRANGEMENT TO THRUST THE ROTOR AGAINST A SHOULDER OF THE SHAFT

REFERENCE TO RELATED APPLICATIONS:

This is a continuation in part application of my application Ser. No. 06-678,540; filed on Dec. 05, 1984; now U.S. Pat. No. 4,664,018; issued on May 12, 1987. The memtioned application Ser. No. 678,540 was filed as a continuation in part application of my earlier patent application Ser. No. 387,567 filed on June 11, 1982; now abandoned, and Ser. No. 521,874 filed on Aug. 10, 1983; now abandoned. Ser. No. 387,567 was a continuation application of my earlier applications 05-954,555, now U.S. Pat. No. 4,358,078, issued on Nov. 09, 1982; 06-122,914; now abandoned, and 282,990; now U.S. Pat. No. 4,557,347; issued on Dec. 10, 1985; and which were filed on 10/25/1978; 02/19/1980; 01/13/1981 and 07/14/1981 respectively. Ser. No. 521,874 is a continuation application of my still earlier patent application Ser No. 06-064,248 which was filed on 08/06/1979 and which is now abandoned. Benefits of the mentioned patent applications are claimed herewith for the present patent application.

FIG. 3 is the most simple construction of the invented motor or pump and is a simplification of FIGS. 1 and 2. FIG. 2 derives from the application 064,248. FIGS. 3 to 13 are new Figures of this present application.

BACKGROUND OF THE INVENTION:

Axial piston pumps and motors have sucessfully operated in great numbers. Commonly they have cylinders with ported ends, wherein the ported ends are of lesser diameter than the diameters of the cylinders are. The machining of the cylinders thereby requires a relatively difficult and costly work, because the cylinders can not be machined straight through the rotor. The cylinder ports of narrowever diameter in addition require an increase of speed of fluid when the fluid flows into and out of the cylinders. That in turn causes friction and reduces the efficiency of the machine.

The common axial piston pumps and motors have intermediate rods between the pistons and the disc. The rods commonly have part-ball formed ends. The pistonward ends are commonly borne in a respective part-ball formed hollow bed in the piston and fastened into the bed in the pistons, so, that the ends of the rods can not escape from the bed of the pistons. That makes it possible to retract the pistons in a suction stroke in a pump by the rods. However, when a piston sticks in the cylinder the device breaks, because the rod can not move away from the piston. The common axial piston devices as far as here described are therefore to a certain extent dangerous in operation, especially, when life depends on their reliability as for example in aircraft applications.

In common axial piston fluid handling devices those part-ball formed ends of the intermediate rods, which are communicated to the disc are borne in part-ball-formed hollow beds in the disc, which is inclined relatively to the axis of the rotor which contains the cylinders. The rear portions of the part-ball formed ends of the intermediate rods, which are borne in the beds of the disc are commonly held by a holding ring with part-ball formed holding beds. The holding ring is fastened to the disc and the mentioned part-ball formed beds of the holding ring are fitting closely around the respective portions of the respective ends of the intermediate rods.

This common system works very satisfactory in operation, however the accurate centering of the holding beds onto the respective portions of the ends of the intermediate rods is very delicate and difficult in machining.

THE AIMS AND OBJECTS OF THE INVENTION:

The first object of the invention is, to provide a rotor with straight through cylinders of equal diameter from cylinder end to cylinder end in combination with a suitable control body for the control of flow of fluid into and out of the rotor.

The second object of the invention is, to prevent or to reduce friction in the flow of fluid at the entrance and exit into and from the cylinders of the device in combination with a suitable control body for the sealing and control of flow of fluid into and out of the rotor.

The third object of the invention is, to provide a medial shaft to center and support rotor of the device.

The fourth object of the invention is, to provide a bearing of the medial shaft on one end thereof and on another end-portion thereof and to do so with little or reduced friction and leakage.

The fifth object of the invention is to provide a shoulder on the medial shaft to bear against the rotor axially.

The sixth object of the invention is to fix the rotor axially between the shoulder of the medial shaft and the control body on the other end of the rotor.

The seventh object of the invention is, to hold the rear portions of the ends of the intermediate rods, which are borne in the disc by a ring with a tapered holding face in order to prevent the difficult, delicate and expensive machining of individual part-ball formed seats on the holding ring.

The eighth object of the invention is, to prevent a fastening of the intermediate rods in the beds of the pistons in order to prevent a disturbance of the device, when a piston sticks;

and the ninth object of the invention is, to guide the piston-most ends of the intermediate rods on the walls of the cylinder when a piston has stuck.

Other aims and objects of the invention may become apparent from the drawing and the description thereof. One of those additional objects is to insert flow-through restriction devices of others of my patents or patent applications into the pistons in order to assure that the pistons are at at all times pressed onto the respective ends of the intermediate rods by high pressure in fluid on the bottoms of the pistons.

BRIEF DESCRIPTION OF THE DRAWINGS:

FIG. 3 is a longitudinal sectional view through a device of the invention.

FIG. 6 is a longitudianl sectional view through a device of the invention.

FIG. 7 shows a portion of FIG. 6 and is a sectional view through FIG. 7.

FIG. 8 is a cross sectional view through FIG. 7 along its arrowed line.

FIG. 9 is a sectional view through a piston of FIG. 3.

FIG. 10 is a sectional view through a piston shoe of FIG. 3.

FIG. 11 is a sectional view through a pin of FIG. 3.

Figure 1:
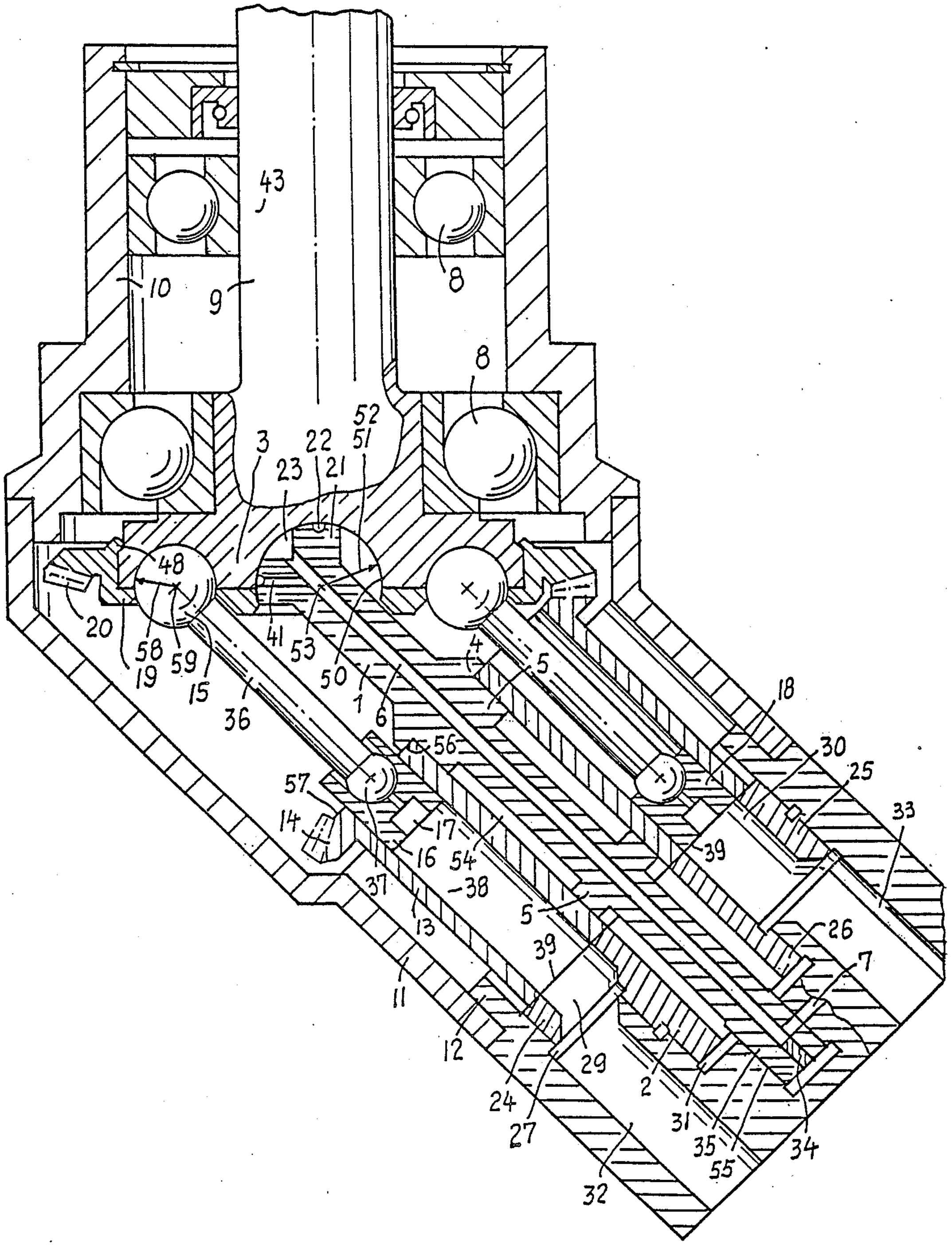
FIG. 1 is a longitudinal sectional view through an embodiment of a motor or pump of the invention.

DESCRIPTION OF THE PREFERRED EMBODIMENTS:

FIG. 1 illustrates an axial piston motor or pump, which has a rotor with pistons reciprocating in its cylinders. Intermediate rods are connected to a relatively inclined rotary drive flange and are borne in or on ends of the pistons for transfer of force between the pistons and the disc. The barrel is connected to or integral with a shaft. The rotor or barrel may be guided and be borne by a medial shaft and the medial shaft may be centered and borne at least partially by a ball part head in a seat of the disc or shaft and on the other end of the medial shaft in a rear housing portion. The medial shaft may have a shoulder to bear the rotor axially. An axially moveable control body may be led onto the back end of the rotor for the control of flow of fluid to and from the rotor and seal along the rear end face of the rotor. The rotor has cylinders, which may be straight through bores of equal diameter from end to end and the control body may be pressed by fluid in thrust chambers against the end face of the rotor where into the cylinders port and thereby seal the ends of the cylinders relative to areas of other pressure. The intermediate rods may have ball-part configurated ends which bear on part ball formed beds of the pistons or in part ball formed seats in the disc. The respective ends of the intermediate rods may be held in the respective seats in the disc by a tapered face of a holding ring. The pistons may be free floating pistons which are not connected to the rods, but which are pressed against the respective ends of the rods by pressure in fluid. Thereby the device is able to continue to operate, when one of the pistons sticks, because the end of the respective rod can depart from the associated piston and remains guided in the cylinder by the cylinder's wall.

More in detail, FIG. 1 shows that front housing 10 bears shaft 43 in bearings 8. Medial housing 11 connects front housing 10 with rear housing 12. Shaft 43 has on its inner end a drive flange 3, with ball-part formed seats for the individual reception of ball-part formed outer heads 15 of intermediate rods 36. Holding ring 19 is fastened to drive flange 3 and holds heads 15 in drive flange 3. The inner heads 37 of rods 36 are also ball-part configurated and are borne on beds, which are hollow and also ball-part formed, of pistons 16 or 18. The pistons reciprocate in cylinders 38.

Rotor 13 rotates in housing 11 and contains the cylinders 38. The rear end of rotor 13 forms together with the front face of the the rear control part the control mirror 39 by the tightly sealed rotation of the rotary control face of the rotor along the stationary control face of the rear control part. Inlet ports and outlet ports 32 and 33 are formed in the rear housing 12.

Fluid is let into the cylinders 38 and out thereof periodically, when the device operates. An inclination is provided relative between the drive flange 3 and the axis of the rotor 13, whereby the intermediate rods 36 between the seats in the drive flange 3 and the beds on the pistons 16, 18 define the piston stroke in the cylinders 38. The device in this way acts either as a motor when fluid under pressure is led into one of the ports 32,33 or as a pump when one of the ports 32,33 takes in fluid under lower pressure and the other of the ports expels it under higher pressure.

So far the operation of the device is known from the former art and so are the actions and locations of its parts.

In the preferred embodiment of the invention the shaft 43 is integral with the rotary drive flange 3. The drive flange 3 has a medial and central hollow ball-part configurated medial seat of a wider radius then common in earlier devices.

Medial shaft 1 is fastened to a central bore in rotor 13. Medial shaft 1 has a front head 21 which is part-ball configurated with a radius subtantially equal to the radius of the mentioned medial seat in drive flange 3. Head 21 is borne in the mentioned medial seat and able to swing therein. Shaft 1 has also a rear end 35 which extends beyond the rotor 13 into the rear portion 12 of the device. A medial bore or passage 6 extends through medial shaft 1 but is closed on the rear end of shaft 1 for example by closure 34 or thereby, that the passage 6 does not extend through the rear end of medial shaft 1. A passage 7 leads fluid under pressure into bore or passage 6 and thereby into recess 23 between medial seat and head 21. The passage of fluid under pressure through passage 7 into passage 6 is done either by supply from the outside or by communication of passage 7 to those of ports 32 or 33 which contains the fluid under the higher pressure. Such communication is known from my U.S. Pat. No. 3,793,924 and the communication means of said patent may be associated to passage 7. The known communication is not shown in the figure of the drawing and passage 7 is shown in part in the drawing. Shaft 1 is seated by fittings 5 in the central bore or hub of rotor 13 and a shoulder of shaft 1 bears on the front end of rotor 13, embracing a portion of the front face of rotor 13. Rotor 13 is pressed by fluid in control ports 29 or 30 towards the shoulder 4 of shaft 1 and medial shaft 1 is pressed by the force onto the shoulder 4 into the lmedial seat in drive shaft 3. In order to obtain this force of pressure in fluid against the rotor 13, the control ports 29 and 30 are respectively so dimensioned, that their cross-sectional area is larger thant the cross-sectional area of the rear end face of the rotor 13 adjacent the control ports 29 and 30. In order to assure a smooth slide of head 21 in the medial seat, there may be an annular groove 22 between the medial seat in 3 and the head 21. It may be supplied with high pressure fluid through communication with passage 6 for example by communication 41. Thereby the medial ball-formed portion of the faces of medial seat in drive flange 3 and head 21 of shaft 1 are lubricated from two ends by high pressure fluid. The swinging motion of head 21 in the medial seat in drive flange 3 therefore takes place at smallest friction. The arrangement of the invention described in this paragraph provides the radial and axial guide of the rotor at the rotor's rotation without any further bearings or means. Because the rotor 13 is kept by medial shaft 1 while medial shaft 1 is held on one end on the medial seat of drive flange 3 and on the other end by seating with its cylindrical rear end portion 35 in a cylindrical seat in the rear portion 12 of the device. Ends 15 of intermediate rods 36 swing in the individual beds in drive flange 3. They are kept therein as known in the art by a ring 13. In the former art however, ring 19 had individual holding faces for each head 15. According to one object of the invention the expensive and delicate machining of such individual holding seats is spared by the application of a common face, for example a slightly tapered annular face 42 of the invention. This face grabs or embraces the rear portions of the heads 15 of rods 36 only in a point, but since there is no load, the retaining of the outer heads 15 in their respective seats in drive flange 3 is enough force to prevent an accidental escape, when there is no pressure in the device. At times of pressure in the device, there is no holding of the heads 15 required, because each cylinder has at all times in operation at least so much pressure in this device, that the pistons 16,18 remain pressed against the rods 36 and the rods 36 remain pressed into their individual seats in drive flange 3 because the device of this invention is not intended to operate mainly as a self-suctioning pump, but operate mainly as a motor or as a pump with pre-pressure in the to-flow ports in a closed cycle.

According to another object of the invention, the holding ring 19 is fastened to drive flange 3 by retaining portions 48 which embrace a rear shoulder of drive flange 3. The embracing may be done by deforming the retainers 48 inwardly after the holding ring 19 is mounted over the drive flange 3. Drive flange 3 and rotor 13 may be provided with coupling means 20, for example gears 20 for the coupling of the drive flange 3 and rotor 13 to revolution in unison.

According to another object of the invention, the pistons 16,18 are free-floating pistons. That means, that the pistons are not connected to the rods 36. On the contrary, the pistons 16,18 could move independently of the intermediate rods 36. This is obtained thereby, that the inner end heads 37 of the intermediate rods 36 are not embraced backwards by holding members or portions of the pistons. Thereby they are free to leave the piston and to depart from the hollow part-ball formed bed of the respective piston 16 or 18. At times of pressure in the respective cylinder 38 behind the piston, the piston is pressed against the inner head 37 of the respective intermediate rod 36 and the inner head 37 of rod 36 cent itself by its spherical form into the spherical hollow bed on the adjacent end of the piston. The feature of this object of the invention is, that when a piston 16 or 18 sticks in a cylinder, the rod 36 can move away from the respective piston and the device does not break. The piston will then be forced into the deepest location in the respective cylinder, remain there stuck and come to rest. The respective intermediate rod 36 will then move freely deeper into and partially out of the respective cylinder 38 whereby the outer face of the inner head 37 moves along the inner wall of the respective cylinder, whereby the intermediate rod 36 remains guided by the wall of the cylinder 38 when it has departed from the respective bed of the respective piston 16 or 18. The length of the intermediate rods is so dimensioned that at all locations of the piston stroke or of the rod 36's movement at least one half of the inner head 37 remains within a cylinder 38. When one of the pistons sticks, the motor or pump loses the non-uniformity of flow and a certain non-uniformity of flow appears. However, the motor or pump can continue to work with the rest of the undisturbed and unstuck pistons until the vehicle or machine wherein the device operates can be set to rest. This feature of the invention is especially important in aircraft with vertical propeller axes, like helicopters or, when the device is used to drive a propeller as fluid motor. The conventional motor of the former art would break, when a piston sticks and the helicopter would then crash. But is case of application of the motor as a helicopter propeller driving fluid motor the motor may continue to work with one or a few pistons stuck until the helicopter has effected an emergency landing.

Rear housing 12 may have a stationary control face to form a control mirror 39 with the rotary control face of the rotor 13. But instead of being a solid portion, the rear housing 12 may also be formed with inner space(s) to receive a control body 2 as demonstrated in the figure of the drawing. Control body 2 may have an innermost centric portion 24 to form the stationary control face of control mirror 39. An eccentric medial portion 25 may be located behind the innermost portion 24 and an again centric portion 26 of smaller diameter may be located as end portion behind the medial eccentric portion 25. Thrust chambers 27 and 28 are thereby formed behind the innermost portion 24 and the medial portion 25. The pressure in fluid in these thrustchambers presses the control body 2 with a suitable but not too strong force against the endface of the rotor to close the control mirror 39 there. Control ports 29 and 30 are provided in the innermost portion 24 to control the flow of fluid into and out of the cylinders 38 of the rotor 13. They are communicated to the thrust chambers 27 or 28 respectively and the ports 32,33 are porting into the thrust chambers 28 or 28 respectively. Fluid now flows through a port 32 or 33 into an through a thrust chamber 27 or 28, through innermost portion 24 of control body 2 and through control port 29 or 30 into the respective cylinders 38 and out thereof in the opposite direction. The cross-sectional areas of the thrust chambers 27,28 and of the portions 24,25 on the one end define in combination with the fluid forces in the control mirror 39 on the other end the remaining force which with the stationary control face of portion 24 is pressed against the rotary control face of rotor 13 in the control mirror 39.

The application of control body 2 of the figure of the drawing is by way of example only. Instead other control bodies may be utilized, such as, for example, those of my U.S. Pat. Nos. 3,831,496; 3,850,201; 3,862,589; 3,889,577; 3,960,060 or thrust pistons and thrust chambers of my U.S. Pat. Nos. 3,398,698; 3,561,328; or 3,697,201. The medial shaft 1 is in the invention commonly extended through the medial bores of the respective control body; for example as shown in the drawing. In case of application of my control body of my U.S. Pat. No. 3,960,060 however, the shaft 1 may have to be extended through a thrust chamber and then have to be sealed in the controlbody and in the housing portion behind the control body in order to prevent leakage out of the thrust chamber. It is most suitable to bear the rear end of shaft 1 as a cylindrical portion in a fitting diameter of a cylindrical wall in the rear portion of the housing, which means in housing portion 12. In rare cases the rear end of the medial shaft may however also be borne in the respective control body.

The several embodiments described in the specification may be applied either singly or in combination. For example the arrangement of the medial shaft 1 may also be applied in those axial piston devices, which do not employ the free-floating pistons. The pistons may be either of the type of referential number 16 or of the type of referential number 18 of FIG. 1, or of commonly used pistons which bear fastened rod heads within the pistons. The pistons may have spaces 17 for the reception and mounting of flow-through restrictions for example of my co-pending application Ser. No. 765,221 now U.S. Pat No. 4,715,411 or others or of others of my patents or applications for radial piston devices. Pistons 16 may have their beds deeply inside of the piston, while alternative pistons 16 may have their beds for bearing of the inner heads 37 of rods 36 on the respective ends on the pistons 18. Thus, heads 37 may either lay inside of pistons 16 or on the bed on the end of pistons 18. The free-floating pistons and rods may also be applied in common axial piston devices and so the holding rings 19 or parts thereof. The gist and content of the invention shall therefore be restricted only by the appended claims.

The terms "control-mirror" or "control-fit" in the specification or claims define tow complementary faces laying or moving closely on each other.

In a deeper study of the embodiment it will be seen, that there are different places, where members are swinging in respective beds. It is therefore suitable to give those different places respective definitions.

Accordingly, the head 21 of the medial shaft may have a first swing center. The sliding faces thereof are formed by first and second radii. The heads 15 of the intermediate rods 36 may form second swing centers and the sliding faces associated thereto may have third and fourth radii. The inner heads 37 of the intermediate rods 36 may form third swing centers with fifth and sixth radii of the thereto associated sliding faces.

The embodiments of the invention may then be described, for example, as follows:

An axial piston type hydraulic or pneumatic device, wherein fluid flows in a plurality of substantially axially cylinders 30 in a substantially cylindrical barrel 43, wherein pistons 16 reciprocate in said cylinders in said barrel, wherein a drive flange 3 contains seats for the bearing and reception of intermediate rods 36 between the drive flange 3 and the pistons, wherein the axis of said drive flange is inclined relatively to the axis of said barrel and thereby defines, guides and limits the strokes of said pistons in said cylinders; the drive flange and the barrel are located in a common housing 10,11, wherein said housing contains in one of its portions entrance ports 32,33, wherein a ported control face 39 is provided in a portion of said housing to closely seal along a complementary control face 39 on one end of said barrel to form a control fit 39 between said control faces 39 for the control of flow of fluid from one of said ports into said cylinders and out of said cylinders into the other of said ports;

wherein the drive flange 3 has a medial hollow spherical seat 50 a first radius 51 around a first seat center 53;

wherein said barrel is hollow and forms a central hub wherein said housing contains a first cylindrical seat in one of its portions;

wherein a medial shaft 1 extends through said hub of said barrel and into said medial seat and into said first cylindrical seat;

wherein said medial shaft forms at one end of said shaft a part-ball formed head 21 of a second radius 52 and on the other end of said shaft a first cylindrical portion 35 of a diameter able to closely fit and move in said cylindrical seat;

wherein said head of said medial shaft is swingably borne in said hollow medial spherical seat of the drive flange while said second radius is substantially equal but very slightly shorter than said first radius to enable said head to swing in said medial seat and maintaining a close fit between the faces of said head and said medial seat;

wherein said medial shaft forms a shoulder 4 with a substantially radial plane face 56 wherein said shaft forms at least one fitting 5 to fit in said hub of said barrel 13 to bear radially against the barrel, wherein said radial plane face 56 extends radially beyond said at least one fitting 5 to bear in axial direction on said radial plane face 56 a substantially radially plane face 57 which is substantially located close to the other end of said barrel, wherein said first cylindrical portion of said medial shaft is borne in said first cylindrical seat of said housing portion; and wherein said barrel is axially kept between said radial plane face of said shoulder of said medial shaft and said stationary control face in said portion of said housing.

or, as:

The device of the above, wherein said barrel is a rotor and the drive flange is rotary and borne in respective bearings; and wherein a coupling means is provided between said rotor and said disc to revolve said disc and said barrel in unison.

Or, as:

The device of the above, wherein one of said portions of said housing is hollow and forms at least one thrust-chamber 27,28;

wherein an axially movable body 2 is inserted into said at least one thrust chamber;

wherein force of high pressure fluid in said at least one thrust chamber presses said axially movable body 2 against said barrel 13;

wherein said barrel 13 is pressed by said axially movable body 2 against said shoulder 4 of said medial shaft 1, and, wherein said barrel is axially kept between said shoulder of said medial shaft and said axially movable body while said medial shaft 1 is axially borne by said part-ball formed head 21 of said medial shaft in said medial hollow spherical seat 50 and radially borne in said medial hollow seat and said first cylindrical seat.

Or, as:

The device of the above, wherein said barrel is axially and radially borne by said medial shaft.

Or, as:

The device of the above, wherein said axially movable body forms said control face, wherein said body forms control ports in said control face, wherein said body has passages to communicate at least one of said control ports with said at least one thrust chamber;

wherein said control face is non-rotary, wherein said barrel forms on the end adjacent to said control face said complementary control face as a rotary control face whereinto said cylinders port, and, wherein said control faces form said control-fit.

Or, as:

The device of the above, wherein said cylinders are straight cylinders which extend with equal diameter through the entire length of said barrel.

Or, as:

The device of the above, wherein said cylinders are straight cylinders which extend with equal diameter through the entire length of said rotor, wherein a first pressure area forms in said control fit while a second fluid pressure area forms in said at least one thrust chamber; and;

wherein said thrust chamber is so dimensioned, that the said second fluid pressure area is slightly higher in axially towards the said rotor directed fluid pressure force, than the sum of the oppositionally directed forces of fluid pressure in said first fluid pressure area and the respective cylinders of said equal diameter through the entire length of said rotor.

Or, as:

The device of the above, wherein said first seat center forms a first swing center;

wherein said second radius is formed around an equally located swing center which coincides with said first swing center;

wherein said equally located swing center is located in said one end of said medial shaft;

wherein said second radius is almost equal to said first radius, wherein said first radius forms a first curved surface;

wherein said second radius forms a first complementary surface;

wherein said first curved surface forms a first bearing bed; and, wherein said first complementary surface of said one end of said medial shaft is swingably borne on said first curved surface of the drive flange which forms said first bearing bed while said surfaces are formed by said first and second radii around said first swing center in said first bed and said one end of said medial shaft.

Or, as:

An axial piston type hydraulic or pneumatic device, wherein fluid flows in a plurality of axially directed cylinders in a substantially cylindrical barrel, wherein pistons reciprocate in said cylinders in said barrel, wherein a drive flange contains seats for the bearing and reception of intermediate rods between the drive flange and said pistons, wherein the axis of the drive flange is inclined relatively to the axis of said barrel and thereby defines, guides or limits the strokes of said pistons in cylinders; wherein the drive flange and the barrel are located in a common housing, wherein said housing contains in one of its portions entrance ports and exit ports, wherein a stationary control face is provided in a portion of said housing to closely seal along a complementary control face on one end of said barrel to form a control firt between said control faces for the control of flow of fluid from one of said ports into said cylinders and out of said cylinders into the other of said ports; and, wherein said seats in the drive flange form second bearing beds;

wherein said second bearing beds are formed by second curved surfaces of third radii;

wherein said third radii are formed around second swing center;

wherein said second swing center are equally radially distanced from a first swing center in the axis of the drive flange;

wherein said intermediate rods form inner ends and outer ends;

wherein said outer ends of said rods are part-ball formed and define second complementary surfaces of fourth radii around said second swing centers;

wherein said fourth radii are almost equal to said third radii;

wherein said outer ends of said rods are borne in said second bearing beds;

wherein said second complementary surfaces engage said second curved surfaces able to slide there along;

wherein a holding ring is mounted on the drive flange for embracing portions of said outer ends of said rods to hold said outer ends in said second bearing beds; and;

wherein said holding ring is provided with an annular face whereof points are able to engage said portions of said outer ends of said rods for preventing said outer ends of said rods from escaping out of the second bearing beds.

Or, as:

The device of the above, wherein said annular face forms a cone with an inclination relatively to the axis of said ring.

Or, as:

The device of the above, wherein said third bearing beds are formed entirely on said top ends of said pistons.

Or, as:

The device of the above, wherein said third bearing beds are formed inside of said pistons by which cylindrical portions are formed on said pistons extneding from said third bearing beds to said top ends of said pistons.

Or, as:

The device of the above, wherein said pistons are provided with passages extending axially through the length of said pistons;

wherein said pistons are provided with reception chambers extending from said rear ends into said pistons;

and, wherein flow-through restriction means are provided in said reception chambers.

Or, also as:

The device of the above, wherein one of said ports contains a fluid under a high pressure;

wherein the other of said ports contains a fluid under a second pressure, wherein said second pressure is forced into or maintained in said other of said ports, and, wherein said second pressure is smaller than said high pressure but high enough to assure and maintain the pressing of said third curved surfaces of said pistons onto the said third complementary surfaces of said rods in order to keep said third surfaces in close engagement on each other.

The devices of the invention may be hydraulic or pneumatic devices as pumps or motors but they may also be used as compressors or expanders for engines and the like.

Figure 2:
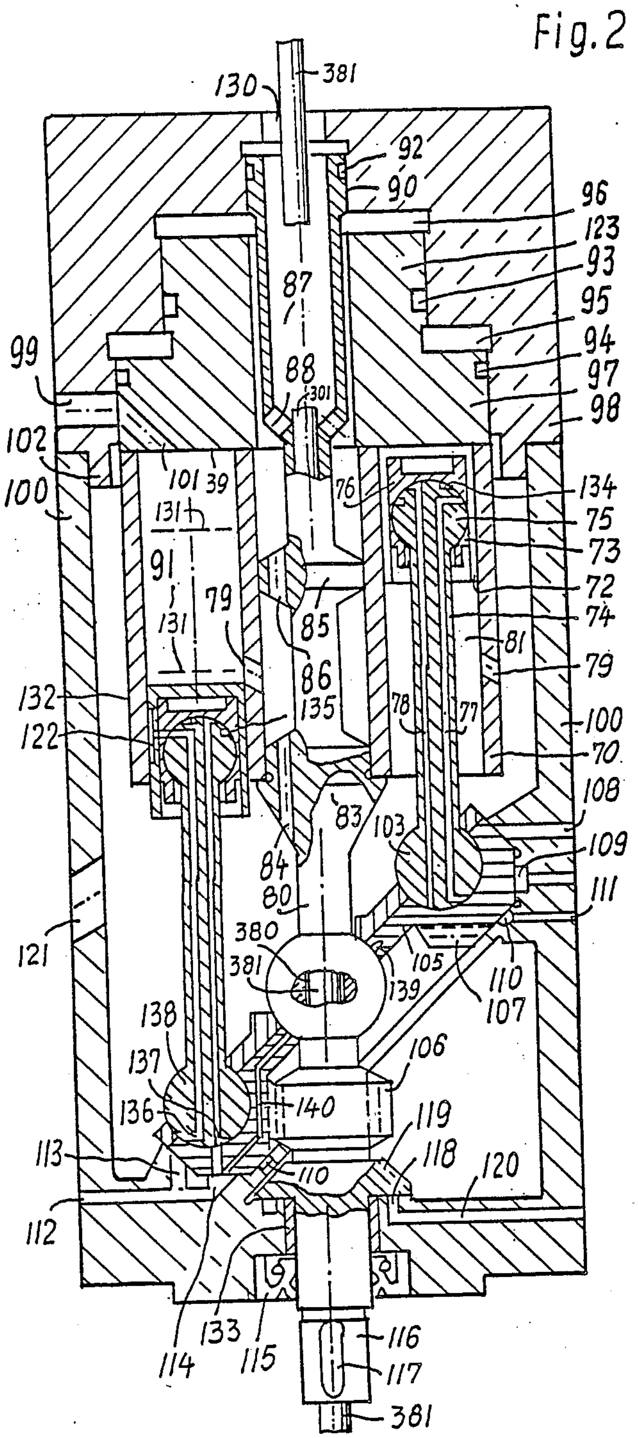
FIG. 2 is a longitudinal sectional view through a further embodiment of the invention.

In FIG. 2 a revolving rotor 70 is driven by shaft 116 or rotor 70 drives shaft 116. Power may be delivered to shaft 116 or taken of therefrom by clutch- or key- means 117. Rotor 70 contains a plurality of cylinder or other working chambers 91 which are generally parallel to the axis of the rotor or inclined thereto. Rotor 70 is therefore occasionally called "a cylinder barrell".

Drive plate 105 is inclined under an angle relatively to the axis of the rotor 70 as shown in the drawing under an angle of 45 degrees. That permits piston strokes of up to 3 or more times the diameter of the piston or displacement member 72. When the chambers 91 are round, they are called cylinders. They may however as well as displacement members or pistons 72 have any other cross-sectional figure, if so desired. Holding plate 104 holds the connecting bar heads 103 in respective, preferred hollow ball part formed seats in the drive plate 105. Drive plate 105 may be driven by gearing means 106, 107 from shaft 116 or vice versa. Drive plate 105 may be borne in bearings 109 to 114.

The chambers 91 in the rotor 70 are preferred to be through-bores of equal cross-sectional area through the entire length of rotor 70 and open towards the outer end thereof. The rotor 70 may thus have an outer end face in sealing engangement with a stationary control face 101 on a stationary control body 97 for periodically opening or closing the chambers 91 to passage means in the control body 97.

FIG. 2 shows the engine head cover 98 to contain two fluid containing thrust chambers 95 and 96 whereof at least one contains a fluid under pressure. Control body 97 is inserted into engine head cover 98 and that of the chambers 95 or 86, or both, which contains fluid under pressure and presses the control body 97 with its control face or seal face 39 against the end face of the rotor 70 to seal along the rotary face of the rotor 70.

FIG. 2 also shows, that control body 97 may have a centric portions close to the rotor 70 and an eccentric portion 123 behind the centric portion. Seal means, preferredly heat resistant seal means, are provided by 93 and 94 to control body portions 97 and 123 in order to seal the chambers 95 and 96 therebehind. Then eccentric portion 123 prevents rotation of the control body 97.

A combustion chamber may be mounted to one or more compressor devices of FIG. 1 and expander device(s) of FIGS. 1 to 2.

According to FIG. 2, the control body and head 97 and 98 may contain a passage 99 for the supply of a cooling flash-fluid, for example, cool air, to flash and cool the respective cylinder at a portion of the rotation of the rotor. The cooling flash-fluid may leave the respective cylinder or chamber 91 through respective cool-fluid exit ports 79 in the rotor and finally the housing of the engine through cool-fluid exit ports 121.

A permanently flowing cooling fluid flow may enter the engine through cooling fluid entrance 130 and flow therefrom through the hollow shaft end 87, leave it through passages 88 to flow into the medial hub or bore of rotor 70 and through further passages 86 and thereafter through radial cooling passages which are radially extending between adjacent cylinders or chambers 91 through rotor 70. After the permenent cooling flow has passed the inner wall of the rotor, cooled it and passed through the radial rotor passages, thereby cooling the rotor 70 and the chambers 91, it leaves the radial passages through the rotor—dotted lines 131—at the radial outer ends thereof and passing the outer face 132 of rotor 70, the permanent, cooling flow also leaves the engine through coolfluid exits 121.

In addition to the herebefore described working actions of the engine parts of FIG. 2 there may be further features incorparated into the respective devices. For example, the shaft 116 may be radially borne in bearings 90 and 133. It may be axially borne in axial bearing 118. Bearing 90 may include a seal 92 for sealing the chamber 96. Rotor 70 may be radially borne on shaft 116 by portions 83 and 85 of shaft 116. The rotor 70 may be axially borne by portion 83 of shaft 116 as far as portion 83 embraces the inner end of rotor 70. Thus, the shaft 116 and rotor 70 are radially and axially borne and thereby able to revolve. The axial position of shaft 116 and rotor 70 are at one end fixed by bearing 118,119 and on the other end by the thrust of chambers 95 or 96 against the controlbody 97 and thereby by the thrust of face 101 of control body 98 against the outer end face of the rotor 70. The chambers 95 and 96 are accordingly dimensioned and located. The details of chambers 95,96 and of control body 98 are calculable from my U.S. Pat. Nos. 3,831,496; 3,850,201; 3,889,577 or 3,960,060.

Pistons 72 may have piston seal rings 129 and they may be hollow or contain insertions 73. The pistons 72 may have spherical ball-part formed beds to contain the ball-part formed inner heads 75 of connecting rods or conrods 74. Conrods 74 may be provided with passages to pass a lubrication, cooling or pressure fluid into respective spaces or recesses in the inner conrod-heads 75.

For example, the rear housing portion may contain lubrication or pressure-fluid entrance passages 108,111,112 or a plurality thereof. Lubrication- and thrust bearing fluid may be passed from them into individual or common fluid pressure thrust or bearing power providing recesses 113,114,108,109,110 and from there through passages 77 or 78 through conrods 74 into conrod inner heads 75 and through them into fluid pressure pockets 134,135 and/or 122. Fluid pressure pockets 134 and 135 bear a part of the pressure excerted from the respective chamber 91 onto the respective piston 70 in order to reduce the mechanical load and/or friction of the respective piston 70 into the respective inner conrod head 75. Fluid pressure pocket 122 may act to bear and counter act partially or totally the centrifugal forces excerted during rotation onto the pistons and or conrods. And fluid pressure pockets 136 and 137, which are communicated to passages 114 or like, may act to bear a part or all of the axial and/or partially radial load of the outer conrod heads 138.

Thrust bearing 118 is supplied with bearing pressure fluid through passage 120. Pressure bearing and lubrication fluid may also be supplied through passage 140 into a flui pressure pocket 139 around a bearing portion 82, kept between disc 105 and holder 104. Holder 104 may be fastened to inclinded disc 105 by respective holding means, not shown in the Figure, because they may be simple bolts or retaining means. The outer conrod heads 103 or 138 are then held in their seats in inclined disc ring 105 by holding ring 104.

It may be noted, that in the engine, the pressure in the working chambers 91 is not equal as in hydraulic devices, but changing gradually during the respective half of rotation or rotor 70, at which the pistons 70 run from outer position—left side of the Figure—to innermost position—right side of the Figure—or vice versa and thereby gradually increase or decrease the volumes of the chambers 91. Consequently, the force exerted by the pressure in the respective chamber 91 onto the respective piston 70 and the respective conrod 74 gradially changes with each half of a revolution of rotor 70. It is therefore preferred to set a plurality of entrance passages 112,111,108 angularly around the periphery of housing 100 and to supply them with different fluid pressures. With lower pressure in those zones, where lower pressure is present in the respective chamber 91, with medial pressure in those zones, where medial pressure acts in the respective chamber 91 and with higher pressure in those zones, where higher pressure acts in the respective chamber 91. As more such separated entrance passages are set, as more detailed will be the counter acting fluid pressure recesses in the conrods and pistons be supplied in order to have such forces as close as possible to bear the forces exerted out of the respective chamber 91 onto the respective piston. In the ideal case the said recesses will bear 80 to 98 percent of the forces exerted from the fluid pressure in the respective chamber 91 onto the respective piston 72.

The fluid pressure pockets 122 may be supplied contrary to FIG. 2 by a permanent pressure in order to permanently act contrary to the acting centrifugal forces of pistons and conrods. The Pistons 72 and conrods 74 may for that purpose have devices to prevent their rotation relative to recesses 122 in order to maintain the recesses 122 in direction contrary on the piston to the said centrifugal forces. The conrods 74 may also have return fluid passages 77 or 78 to return the heated fluid out of the respective fluid pressure recesses 122,135,134,136,137 and the like.

The device of FIG. 2 has the further feature that the shaft 80 goes straight through the entire length of the device. That makes it possible to extend a straight bore 380 through the shaft 80 and set an independent shaft 381 through the bore 380 and thereby through the entire shaft 80 and through the entire length of the device. Such independent shaft 381 may serve to control a member which may be provided on the other end of the housing of the machine. But the independent shaft 381 can also serve to drive an additional device on the other end of the housing of the device. The shaft 381 is independent of the main shaft 80 and can revolve with another rotary angular velocity than the main shaft 80 revolves or it can reciprocate in the main shaft 80. Naturally it can also become fixed to the main shaft 80 and move or revolve with the main shaft 80 in unison.

Figure 3:
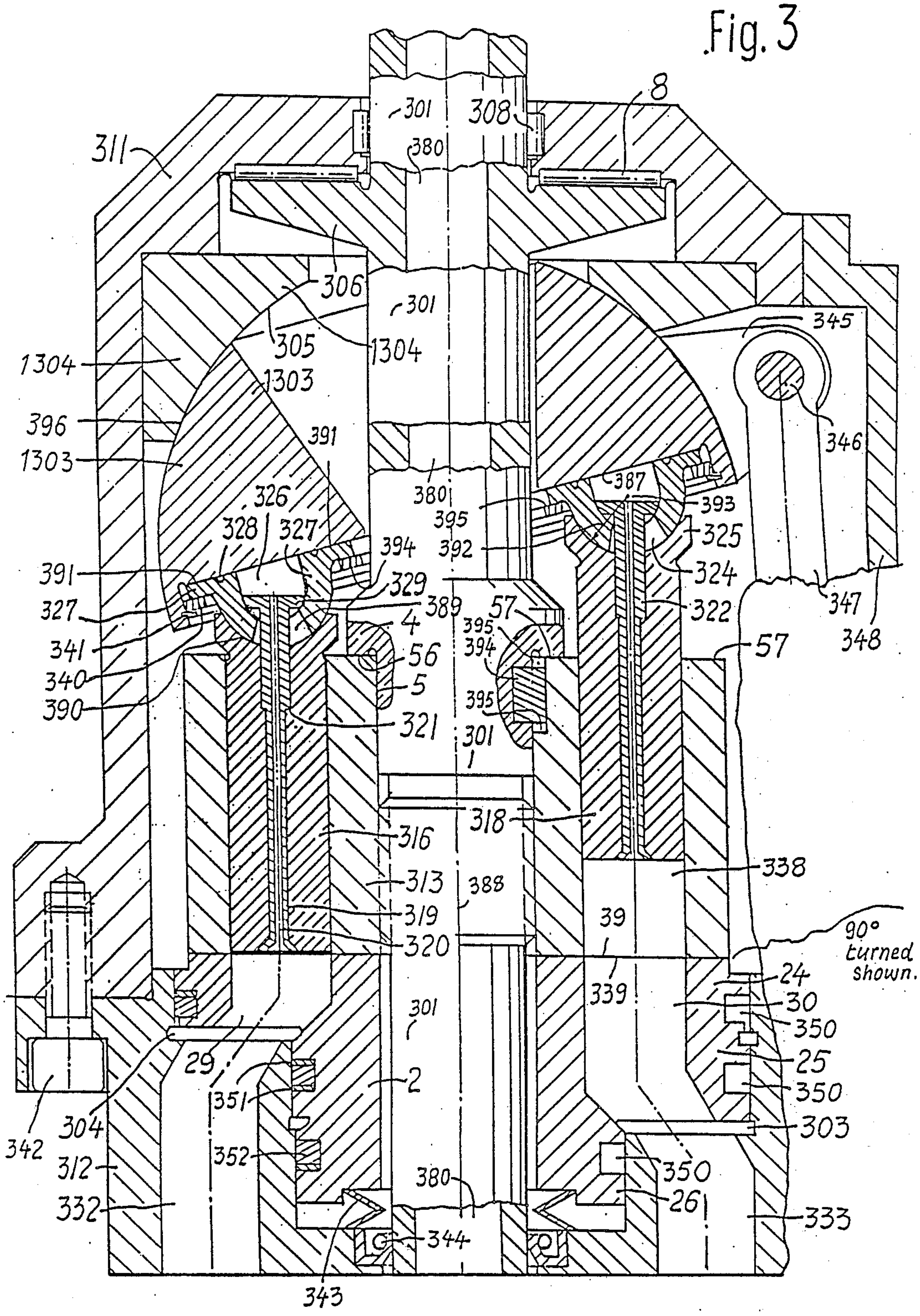
FIG. 3 is a longitudinal sectional view through still another embodiment of the invention.
Figure 4:
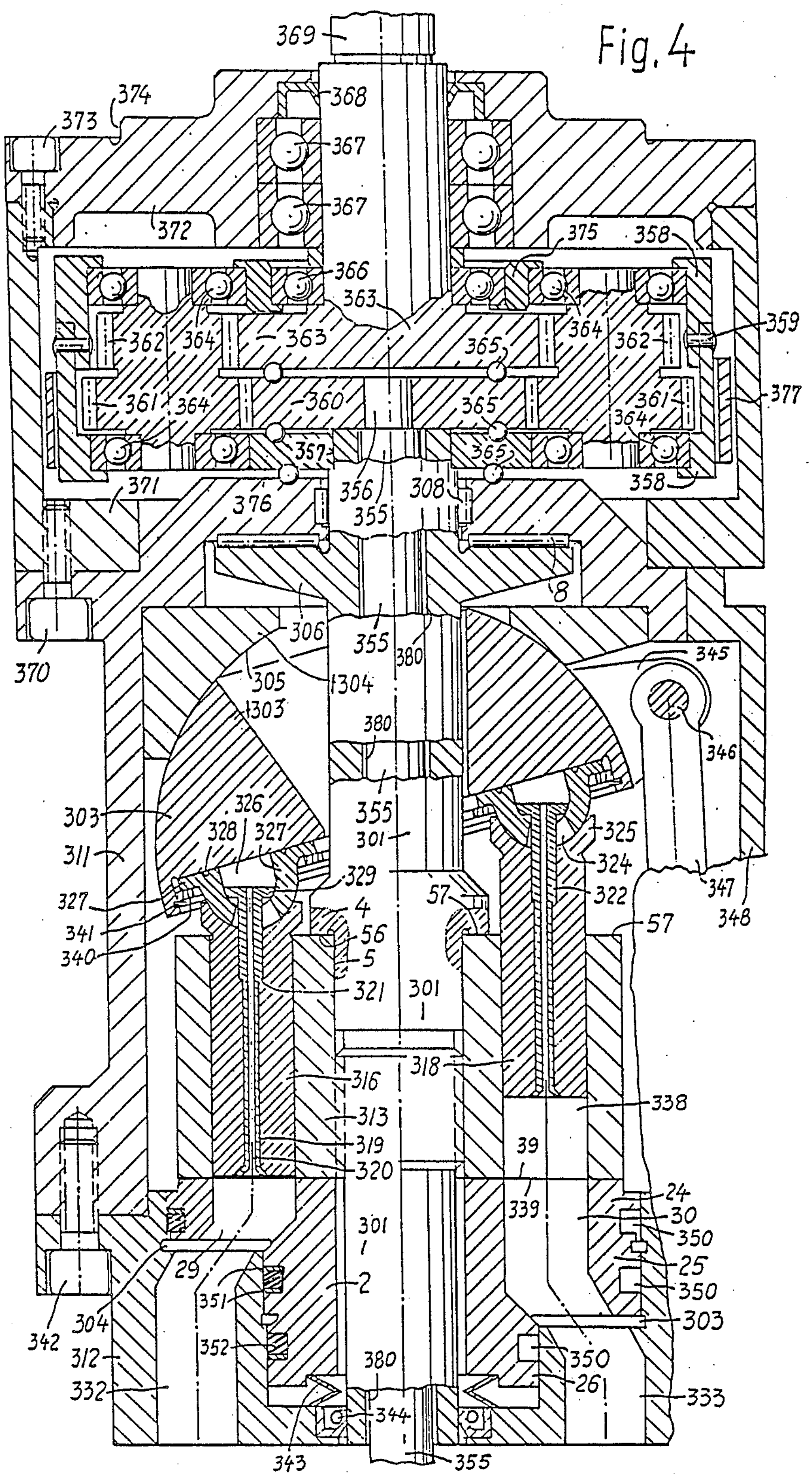
FIG. 4 is a longitudinal sectional view through a device of the invention.

This feature is also shown in FIGS. 3 and 4. In both of these Figures the main shaft 301 extends straight through the housing of the pump or motor. Since it extends in straight direction around the axis, a bore 380 is provided and extends axially through the entire main shaft 301. Inserted through the bore 380 in the main shaft 301 may then be an independent shaft 355. In FIG. 3 this independent shaft is not assembled but it is assembled in FIG. 4. It will be seen later at hand of the description of FIG. 4 that such an independent shaft 355 which extends through a bore 380 in the main shaft 301 can provide extraordinary features to a pump or, especially, also to a motor.

In FIG. 3 the axial piston machine of the invention, which may act or serve as a pump or as a motor, is provided in the housing 311 with the cover 312. The main feature of this embodiment of the invention is that the main shaft 301 is provided with a thrust bearing portion 306 and with a shoulder 4 with a radial plane shoulder face 56. Rearward of the shoulder 4 the shaft has a slightly smaller diameter to bear thereon the rotor 313 with the cylindrical concentration seat 5. To prevent any axial movement of the rotor in the direction of the thrust bearing, the rotor is provided on its two ends with two radial plane faces. The front face forms the holding face portion 57 which is laid against the radial plane face 56 of the shoulder 4 of the shaft 301 and is borne thereon. The rear end face 339 forms the control face for the flow of fluid into and out of the cylinders 338. The cylinders 338 are provided in the rotor 313 and are preferred to extend parallel to the main axis straightly axially through the entire length of the rotor. On the rear end of the rotor the control- and thrust-body 2 is provided in the cover 312 and is axially moveable therein but prevented from rotation around its axis. The control body 2 is provided with passages and ports 29,30 for the leading of a flow of fluid into the cylinders and away from the cylinders 338. The control body has a front portion which is concentric relative to the axis and this front portion is provided with the control ports 29 and 30 as well as with the stationary and radially plane control face 39 whereon the rotary control face 339, the rear face of the rotor 313, slides when the rotor revolves.

The cover 312 with the therein provided thrust-and control-body 2 is in the Figure and also in FIG. 4, 90 degrees turned illustrated. This is common in manufacturing drawings for devices with axial flow control bodies. The control body 2 has rearwards of its front portion 24 the eccentric portion 25 which is radially distanced from the concentric axis of the front portion 24. The front portion is axially slidably but closely sealingly fitted in a respective seat in the cover 312 and so is the eccentric portion 25. Between the sealed seats of the portions 24 and 25 is the thrust chamber 304 provided. If high pressure fluid enters through port 332 it flows through the thrust chamber 304 and presses thereby the control body 2 towards the rotor 313 to form a seal against escape of leakage along the junction of control face 3 and rotary control face 339 of the rotor 313. The force with which, due to the respectively large dimensioned cross sectional area of thrust chamber 304, the control body 2 presses against the rear face 339 of rotor 313, the rotor 313 is pressed with its front portion by front face portion 57 against the holding face 56 of the shoulder 4 of main shaft 301 while the main shaft 301 is thereby pressed with its axial bearing portion 306 against the thrust bearing 8 in the housing 311. The shaft 301 thereby revolves in radial bearing 308 and borne axially in thrust bearing 8 because when the pressure fluid flows from the control port 29 into the respective cylinders 338 of the rotor 313, the fluid presses against the bottoms of the respective pistons 316 while the respective pistons then press against the rear portions of the piston shoes whereby the front faces of the piston shoes 327 press against the inclined piston stroke guide face 387 of the piston stroke guide member 303. Since the piston shoes can not move anywhere else, they start to slide along the piston stroke guide face 387 in the direction away from the rotor whereby they tract the rotor to revolve around its axis 388. After a half of a revolution the respective piston is pushed back into the rotor while the fluid is pressed out of the respective cylinder 338 at the low pressure half of the machine and the low pressure half of the respective revolution.

While the herebefore described functioning of the device of FIG. 3 is substantially similar to that of FIGS. 1 or 2 (partially with the exception of the bore 380 and the therethrough extending independent shaft 355), the embodiment of the invention of FIG. 3 differs from the embodiments of FIGS. 1 and 2 wherein the pistons 316 are provided with bearing beds 389 in piston heads 325 to bear therein the pivot faces 390 of piston shoes 327. Thereby the piston shoes 327 can pivot in the bearing beds of the pistons. The front portions of the piston shoes are provided with radially plane slide faces 391 to slide or run therewith on the piston stroke guide face 387 of piston stroke guide member 303. The bearing bed faces 398 are preferred to be in the configuration of a portion of the inner face of a hollow ball with an extension of less than half of a respective hollow ball. The rear pivot faces 390 of the piston shoes are complementary configurated respective to the bearing bed faces 389 and thereby of a configuration of the outer face of less than a half of a ball. Thereby the bearing bed faces 389 and the pivot faces 390 form complementary curved ball portion faces with a comon radius 392 around a common center of pivotal movement for the respective piston 316 and piston shoe 327.

Since the piston shoes might fall out of the bearing bed face 389, it is preferred, as illustrated in FIG. 3, to fasten the piston shoes 327 pivotably to the respective pistons 316. Thereby one piston will pivotably bear and hold one piston shoe. The pivotable fastening of the respective piston shoe 327 to the respective piston 316 is accomplished in the device of FIG. 3 by the provision of a differentail longitudinal bore through the piston with the bore having a front portion of a bigger diameter and a rear portion of a smaller diameter. Inserted from the front end is a holding pin which has a holding head 329 which engages slidingly a part ball formed portion of the inner face of a recess 326 in the piston shoe 327, while a shaft extends rearward from the head 329 of the holding pin through a rearward open recess 324 of the piston shoe and then into the front portion of the bore in the piston until the rear end of the bigger portion of the holding shaft 322 meets the end 322 of the bigger diameter front portion of the mentioned bore through the piston and comes to rest there, while the rear portion 319 of the holding pin extends rearward through the rear portion of the bore in the piston to the rear end of the respective piston 316. At the rear end portion of the piston the holding shaft is fastened, for example, riveted, to the piston to prevent an escape out of the piston in frontwards direction. The fastening or rivetting of the holding pin may be done at any other location of the axial length of the respective piston 316, but the fixing at the rear end of the piston is an inexpensive and simple solution. The frontwards open recess 326 of the piston shoe communicates with the rearwards open recess 324 of the piston shoe. The rearwards open recess 324 is preferred to have a smaller diameter inwards of the piston shoe, where it meets the frontwards open recess 326, in order to have an extended part ball formed face portion of the frontwards open recess 326 for a proper holding of the holding pin's head 329. To prevent a sticking, welding, bending of the head 329 on the face portion of the recess 326, the bigger diameter front portion 322 of the holding pin has a respective axial length which defines the small clearance between the head 329 and the face of recess 326 by keeping the mentioned length of portion 322 very slighty longer than the distance from the rear face of head 329 to the end 321 of the bigger diameter front portion of the bore in the piston. The rear face of head 329 is complementary configurated relative to the part bal configurated portion of the face of the frontward open recess 326. A bore 320 is extended through the entire length of the holding pin and thereby through the piston to lead and communicate fluid from the respective cylinder 338 to the respective frontwards open recess 326 of the respective piston shoe 327. Thereby the pivot faces between the piston and the piston shoe are lubricated and the frontwards open recess 326 forms a hydrostatic bearing with fluid pressure pocket 326 with a sealing land there around in and on the respective piston shoe 327. The sealing land ends on the unloading recess 328 which is a circular recess with a radius around the center of the front end of the frontwards open recess 326 and the unloading recess 328 is communicated by a respective passage, which is not shown in the Figure, to a space under subtantial low pressure in the device, for example, to the interior of the housing 311 or to the low pressure port 30 of the device. While heretofore the function of the device is described under the condition that ports 332,29 are the high pressure ports, the function can become reversed, using ports 333,30 as high pressure ports, if the control body is provided with the rear portion 26 and the second pressure chamber 303. For one directional uses, however, the rear portion 26 of the control body 2 may be left away and if that is done then the ports 332 and 29 are at all times used as the high pressure ports. The seats of the control body portions 24 and 25 (and if provided, also of 26) may be sealed in the cover 312 by the provision of seal ring beds 350 (shown empty in the right portion of cover 312 of FIG. 3) for the insertion of plastic seal rings 352, or of plastic seal rings 352 and back up rings 351 of stronger material. The plasticly deformable seal rings and/or back up rings are shown inserted into the respective seal ring beds 350 in the left side of the cover 312 of FIG. 3.

If the device of FIG. 3 shall be used as a self suctioning pump, it is preferred to tract the pistons outwards in the cylinders by mechanical means. For such purposes the radial outer portions of the piston shoes become provided with radially plane traction faces 394. A traction ring member 340 is then laid with its radially plane traction face portions 395 against the radial plane traction face portions 394 of the piston shoes. The traction ring member 340 can then be held with its rear face portion by a respective snap ring 341 which can be inserted and be kept in a respective annular groove in the piston stroke guide body 1303. If the device is for a fixed stroke embodiment, the piston stroke body may be fastened for the desired lengths of the piston strokes in the housing 311. If, however, the piston strokes shall be variable in length of stroke, thereby defining a variable pump or motor, the piston stroke guide body becomes pivotably mounted in the housing 311. In FIG. 3 the piston stroke guide body has for this purpose a rear end face of a form of a part of the outer face of a ball to be pivotably borne in a respective holding body 1304 which is for that purpose provided with a complementary face 305 to bear thereon pivotable the rear face 396 of the piston stroke guide body 1303. The faces 305 and 396 are then complementary relative to each other and the piston stroke guide body 303 can pivot with face 396 on face 305 in body 304. The piston stroke guide body 303 is provided with a connection member 345 to hold thereon by a pin 346 the rear eye portion of a lever 347 which connects to a respective piston stroke control device which may be assembled or mounted in the control housing portion 348. The piston stroke controller may be of mechanic nature, electrically, hydraulically or pneumatically operated as it is known in the art. Since such controllers are known in the art, the controller to which the lever 347 is connected, is not illustrated in the Figure.

The cover portion 312 may be fastened by bolts 342 or other fastening or holding means to the housing 311. An assistance spring 343 may be provided rearwards of control body 2 to press the control body to sealing engagement on the rotor's rear end at low pressure in the device and a shaft seal 344 may be provided to seal the rear portion of shaft 301 if this shaft extends rearwards out of the cover 312.

In the embodiment of the invention which is illustrated in FIG. 4, the bottom portion corresponds fully to FIG. 3, however, in a reduced scale. The most important referential numbers which were discussed at the description of FIG. 3 are also present in FIG. 4, but some of the referential numerals are left away in FIG. 4 because they have been extensively described at the description of FIG. 3.

Important in FIG. 4 is, that according to the invention, the bore 380, axially extending through the shaft 301, is used to locate therein and extend therethrough the independent shaft 355. The independent shaft 355 extends rearwards out of the cover 312 and thereby also out of the main shaft 301. The independent shaft 355 is free to revolve in the bore 380 independently of the revolution of the main shaft 301. The front end of the independent shaft 355 is provided with a seat 356 to fasten thereon a first gear 360. The housing 311 is provided with a seat to center and fasten thereon, for example by bolts 370, a gear housing 371. The gear housing 371 is provided on its front end with a gear housing cover 372 which may be fastened, for example by bolts 373, to the gear housing 371. The cover 372 may be provided with a centering seat 374 and in the Figure it carries the shaft seal 368 and the bearings 367 to hold revolvably therein the outgoing drive shaft 369. The rear end of drive shaft 369 is provided with the fourth gear 363 or is integral with it. The main shaft 301 has on its front end a seat 357 to fasten thereon the rear end plate of a revolvable, gears holding, housing 358. The revolvable housing 358 may be made of two portions which are fastened together by the holding means 359 or by a plurality thereof. The revolvable housing consists of the radial outer axially extending portion(s) 85 with the radially inwardly extending rear plate portion 376 (which is fastened to the front end seat 356 of the main shaft 301) and the radially inwardly extending front plate 375. The front and rear plates 375 and 376 are provided with bores (seats) to hold therein the bearings 364. Embracing portions on the respective portions of revolvable housing 358 embrace axially outsidely portions of the bearings 364 to prevent their departure from the seats in the end plate portions 375 and 376. In the bearings are double gear members provided, which form the second gear(s) 361 and the third gear(s) 362. There may be one gear 361 and one gear 362, but commonly there is a plurality of such second and third gears provided angularly spaced in the end plates 375 and 376 of the revolvable housing 358. In the Figure the second and third gears are made by integral bodies together with their end shafts which are borne in the bearings 364. Instead of making the shafts with the second and third gears integral by one body, they may also be built by a shaft borne in two bearings 364 with second and third gears mounted and keyed to the mentioned shafts, which are borne in the respective bearings 364. Axial bearings 365 may be provided to prevent dislocation of respective gears or plates in axial direction. Important is that the first gear 360 meshes into the teeth of the second gear 361, while the third gear 362 meshes with its teeth into the teeth of the fourth gear 363. The diameters of the gears and the number of teeth are defined by the actual design. While the axial rear end of the revolvable housing 358 is borne and driven on and by the front end of the main shaft 301, the front end of the revolvable housing 358 is borne with its front plate 375 on a bearing 366 with the bearing 366 inwards borne on the outgoing drive shaft 369 or on a respective portion of the gear cover 372.

The device of FIG. 4 now can function in three different ways. The first way of action is that the independent shaft 355 is kept rearwards of the control cover 312 in rest. Fluid is then led under pressure into port 332 to revolve the rotor 313 as a fluid motor. Thereby the main shaft 301 revolves in unison with the rotor 313. Since the rotatable gear housing 358 is fastened to the front end of the main shaft 301, the revolvable gear housing 358 revolves also in unison with the main shaft 301 and with the rotor 313. Since the independent shaft 355 is kept in rest, the first gear 360 is also kept in rest. The revolving housing 358 now revolves the second gear on the now stationary first gear whereby the second gear revolves in unison with the third gear and thereby drives the fourth gear to revolve, whereby the outgoing drive shaft 369 is revolved by the fluid motor in housing 311 over the gear train in the gear housing 371. A respective ratio of transmission may be provided by the respective dimensioning of the first to the fourth gears with respective numbers of teeth on the first to fourth gears.

The second function is to keep the rotor 313 of the fluid motor in rest. That may be obtained by stopping or closing the ports 332 or 333 by mechanical means or by stopping the flow of fluid into or out of them. Now the independent shaft 355.is driven by a source of power. Since the independent shaft 355 carries on its front end the first gear 360, the shaft 355 and the first gear 360 now revolve in unison. Since the rotatable gear housing 358 is stopped by the rotor 313 of the fluid motor, the housing 358 is kept in rest. The first gear 360 now drives the second gear 361 whereby the third gear drives the fourth gear 363 and thereby the outgoing shaft 369. This second style of action or of function is the pure mechanical drive of outgoing shaft 369 through the bore 380 in the main shaft 301 of the fluid motor while the first style of action or of function was the pure fluid drive of the outgoing shaft 369 by the fluid motor in the fluid motor housings 311,312.

The third style of action or of function of the device of FIG. 4 is the combined mechanic- and fluid- drive, for example, the mechanic-hydrostatic or the mechaninpneumatic drive of the outgoing shaft 369. In this third way of functioning the fluid motor is driven by leading fluid through one of the ports to drive the rotor 313 in the one or in the opposed rotary direction, while the independent shaft 355 is independently of the rotor 313 of the fluid motor driven also in one or in the opposed rotary direction. By setting now a variable pump with a fluid line connection to one of the ports 332,333, or to both of them, the rotary velocity of the outgoing shaft can be controlled between zero and maximum of revolutions per unit of time and also the rotary direction of the outgoing shaft 369 can become reversed. Any ratio of mechanic power to fluid drive power may be obtained if suitable sources of power are used and respectively controlled. The device of FIG. 4 thereby provides an outgoing shaft 369 with a capability to revolve with extremely high revolutions in both rotary directions, a variablity of the number of revolutions per unit of time and a possibility to elect freely the wide variablity of the fluid drive or the more efficient, but ofter not variable or not stepless variable, pure mechanic direct drive. The election of suitable sizes of diameters and number of 11 of the first to fourth gears adds additional variation possibilities by design and actual building to the very useful embodiment of FIG. 4 of the present invention.

In the devices the rotors should be prevented from rotation relative to the respective shaft and shoulder of the shaft. That is illustrated in FIG. 3 by way of example, by setting a key 394 into respective key ways 394 in the rotor and in the respective portion of the shaft. Similar provisions must be taken also in FIGS. 2 and 4. In the bottom porting of the rotor 313 of FIG. 3 the more preferred style is shown by spline grooves and spline by the dotted lines of rotor 313 and shaft 301. Thus, one single key or multiple keys and key ways or other suitable means are to be provided to prevent any rotation of the rotor relative to the shaft. Such means can also be self holding seats with press fits.

Figure 5:
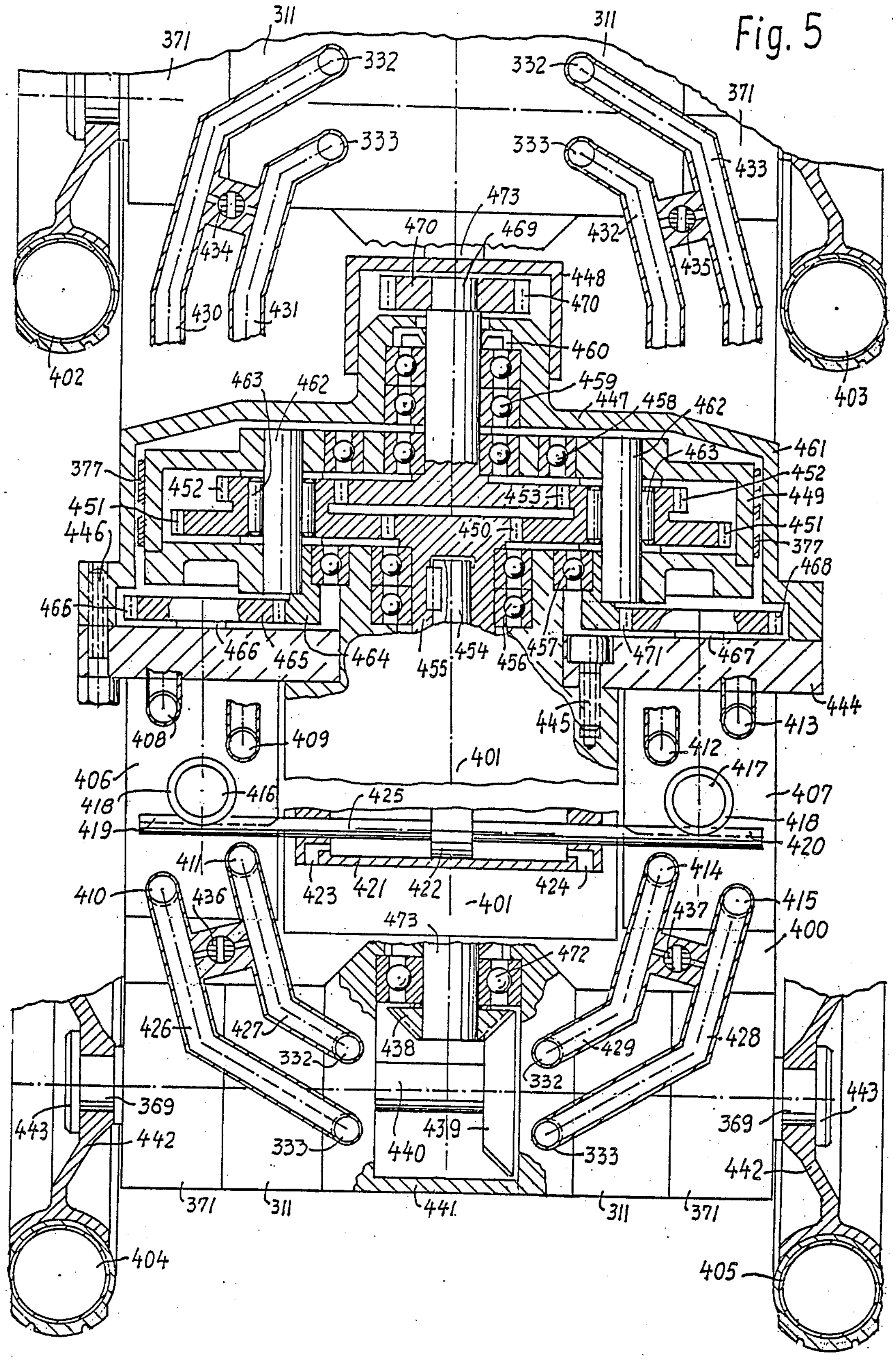
FIG. 5 is a longitudinal sectional view through a device of the invention.

In FIG. 5 the devices of the invention are mounted to a body 400 which may be the base of a vehicle, for example, of a car, truck, bus, locomotive or the like. Thereby a stepless variable automatic transmission for multiple wheel drives can be obtained. Such transmission can also work automatically with differential free or locked and for obtaining best performances at different speeds and conditions of ground.

The power plant, which may be a combustion engine, gas engine, gas turbine or the like, 401 is mounted to the body 4 and connected to drive over an outgoing engine shaft 454 the first gear 450 of a transmission portion which is mounted into housing 461. Housing 461 is fastened to the housing of the power plant by holder(s) 446. An intermediate plate or body 444 may be mounted between the power plant and the transmission's first housing to facilitate an easy assembly. Such plate 444 may be fastend by holders 445 to the housing of the power plant, while housing 461 may then be fastened to the plate 444. Shaft 454 of the power plant is keyed to the holding portion 455 of the first gear 450. A revolvable housing 449 is revolvable obtained in housing 461 and borne therein by bearings 457 and 458. The revolvable housing is provided with seats for pins 462 which carry bearings 463 whereon double gears 451,452 are revolvably borne. An outgoing drive shaft 469 is revolvable borne in bearings 459 in the housing 461 and may be sealed by shaft seal 460. The outgoing shaft may be integral with a fourth gear 453 in the housing 461 and carries an outgoing gear 470 outwards of housing 461. The mentioned double gears form the second gears 451 and the third gears 452 which revolve or rest in unison. The first gear 450 meshes with the second gear while the third gear meshes with the fourth gear. The revolvable housing is provided on its outside with the sixths gear 471 on revolvable housing portion 464. If gear 471 is the sixth gear, then gear 470 is the fifth gear. Further mounted are at least two pumps, which may be single flow or multi flow pumps and which are shown by 406 and 407. Each of the pumps is provided on its shaft with a gear, which now are the seventh, eigth, or other gears, and they are shown by 466 and 468. The minimum is to assemble one such pump. But commonly two or four such pumps are assembled, each of the pumps has then a gear and the respective gear of the shaft of the pump meshes with the sixth gear 471.

If the shaft of the power plant or engine 401 revolves, the first gear revolves in unison with the engine's outgoing shaft 454. The mentioned first gear would then revolve the second and third gears accordingly whereby the third gear would drive and revolve the fourth gear and thereby the outgoing shaft 469 with fifth gear 470. The fifth gear meshes with an outer shaft gear, which is not shown in the Figure because it is placed below the fifth gear and is thereby invisible. The outer gear is mounted or associated to the outer shaft 473. A housing 448 may be set to protect the last mentioned two gears. The outer shaft 473 is connected to a differential of the vehicle, or, as shown in the bottom portion of FIG. 5, to a rectangular gear 438,439 to drive over an axle 440 respective rotors or wheels 442.

If the power plant uses full power immediately and the vehicle is in rest, the resistance against acceleration is so very high, that the outgoing shaft 469 can not revolve. As a consequence thereof and due to the high force of the first gear 450, the revolvable housing 449 starts to revolve and thereby to drive the pump or pumps 406,407 over their ingoing gears 466,468 by the outgoing gear 471 of the mentioned revolvable housing. Note that the gears of the pumps are mounted on the shafts 466,467 of the respective pumps 406,407, respectively. The pumps may be variable pumps and be set to small delivery quantity. In such state of small delivery strokes the pumps consume only small power, smaller than the resistance against acceleration by the outgoing gear 470. Consequently, the pumps start to deliver fluid while the outgoing shaft 469 remains in rest. The pumps then supply pressurized fluid through respective fluid lines to respective fluid motors to drive the respective rotors or wheels. The vehicle starts to move forward with large torque in the wheels. With increase of speed of the vehicle the pumps become set to bigger delivery quantity, whereby the wheels become revolved faster and the vehicle travels faster. As soon as the vehicle is sufficiently accelerated and has obtained a speed with smaller requirement of torque, the torque requirement of the pumps will become higher than the torque required on the outgoing shaft 469. If the required torque of the pumps becomes much higher than that of the outgoing shaft, the pumps may stop to revolve and the vehicle will then run exclusively by the mechanical drive (transmission) of the outgoing shaft 469. The first described state of operation is then obtained. Between the state of pure mechanic drive and the other state of pure fluid drive via the pumps and motors, a mixed state may occur at which both systems work together with the ratio between a fraction of the mechanical drive and a fraction of the fluid drive gradually changing depending on speeds and resistances (torque requirements) of the vehicle.

While, as fluid motors, the motors of FIGS. 1 to 3 may be used by reason of keeping costs down, the better performance of a vehicle is obtainable by employing the motor of FIG. 4 or FIG. 4, combined with FIG. 6. In the embodiment of FIG. 5 four rotors (wheels) 402 to 405 are to be driven. Consequently, four motors of FIG. 4 are employed and shown by their housings 311 with 371. The firsth to fourth gears of FIG. 4 will in the housings 371 of motors 311 be defined as fifth to eighth gears, respectively. Their outgoing drive shafts 369 carry the respective rotors or wheels 442, which may have tires 404 and which may be fastened to the shafts 369 by holding arrangement 443. According to FIG. 4 an independent shaft is extended through the bore in the main shaft and the independent shaft may extend in FIG. 5 as an axle 440 from the motor on the one side to the motor on the opposite side. If so, the respective independent shaft 355 of FIG. 4 would become the axle 440 of FIG. 5 and extend into two of the motors 311.

The axle would then be driven by the gear 439 which in turn is driven by gear 438 of outer shaft 473 while outer shaft 473 is driven by the outgoing gear 470 of FIG. 5. A similar arrangement as in the bottom portion of FIG. 5 is arranged in the top portion of FIG. 5. The bottom portion may constitute the rear wheels of a car, while the top portion of the Figure may represent the front wheels of a car. The outer shaft 473 would then extend not only to the rear portion but also to the front portion of the vehicle and drive there again over a gear 438 a thereto rectangluarly axed gear 439. As mentioned already earlier, the gears 438,439 may be replaced by common differentials as in cars whereupon the axle 440 may be replaced by individual independent shafts 355.

The motors 311 (defined by their housing's referential number) have ports 332 and 333 as in FIG. 3, however in FIG. 5 upwards directed illustrated. The pumps 406 and 407 should be in this particular case variable two flow pumps with equal rates of flow in the two flows per pump or any other suitable pump. To avoid disappointments and to be on the safe side, respective pumps of Eickmann patents 3,249,060; 3,273,511; 3,270,685; 3,398,698; 3,346,262; 3,561,428; 3,697,201; 3,862,589; 3,951,044 or of other Eickmann patents maybe used. A double flow pump of such type has two entrance ports and two delivery ports. Thereby each of the pumps in FIG. 5 has four ports for together two entrance flows and two exits flows of fluid. These ports are shown by 408 to 415. Consequently, since each pair of ports is to be connected to a respective motor of the motors, the following communications are shown in FIG. 5. Fluid line 426 connects the pump's port 410 to the motor's port 333 of the rear left motor. Fluid line 427 connects the pump's port 411 to port 332 of the rear left motor. Fluid line 428 communicates the right's pump port 415 to port 333 of the right rear motor. Fluid line 429 connect's the pump's port 414 to port 332 of the rear right motor. Fluid line 430 connects pump's port 408 to port 332 of the front left motor, while fluid line 431 communicates the pump's port 409 to port 333 of the front left motor, and fluid line 432 communicates pump port 412 to port 333 of the right front motor while fluid line 433 connects the last pump port 413 to the last port 332 of the right side front motor.

Between two fluid lines to a respective motor, for example, between fluid lines 426 with 427; 428 with 429; 430 with 431; or 432 with 433 respective orifice bypasses may be set if they include a variable orifice member 434,435,436 or 437. These members are shown in closed position in FIG. 5. To open them completely they would have to be turned by 75 degrees. For partial opening they would be turned with a smaller rate of degrees. These orifices can be used as a stepless variable differential lock or differential freeing device because the degree of turn opens the passage in the orifice in a desired rate of opening or closing relative to the two communicated fluid lines. One of the communicated fluid lines is a pressurized delivery fluid line while the other is a low pressure return fluid line. By partially or entirely opening an orifice 434 to 437 a respective small or big amount of fluid can escape through the orifice from the drive fluid line to the return fluid line or vice versa. If the pumps are variable and reversible pumps the fluid lines can become reversed whereby a former delivery line becomes a return fluid line and vice versa. Instead of setting orifices between fluid lines to the same motor, such orifices may also be set between fluid lines of different motors. Thereby they would open a differential action between the wheels if the orifice is opened.

Since the pumps 406 and 407 are driven in unison by the outer gear 471 of the rotary housing, it follows, that, if one of the motors is driven by a pump, all other three motors are driven equally by the pumps if the orifices are closed. That means that the fluid drive of FIG. 5 is a four wheel drive with differential lock if the fluid power portion of the device operates. Since on the other hand, the outgoing shaft 469 for the mechanic drive is meshed by gear 470 and its co-operating gear to the outer shaft 437 to the front and to the rear rectangular gears 438,439 and thereby to the independent shafts 440,355 of all four motors 311,371, the mechanical drive is also a four wheel drive in FIG. 5. Since both principles, the mechanic or the fluid power drive may act separately at different times or combined at an equal time, the arrangement of FIG. 5 is an automatic stepless varying fluid-power and mechanical transmission. The device is then operated by the power controller of the power plant and by the delivery quantity controller(s) of the pump(s). The delivery quantity controllers of the variable double flow pumps 406 and 407 are shown by 416 and 417. They are to be operated in unison to maintain equal rates of flows in the outlets of the pumps. For this operation in unison the pump controllers 416 and 417 are provided with gear means 418 which are subjected to a common controller 425 with engaging members 419,420, which may be meshing gear teeth for the gears 418. A power stearing may selectively supply fluid into one of the ports 423 or 424 of a cylinder 421 wherein the piston 422 is reciprocable to drive the common controller 425 in one or the opposite direction in order to increase or to decrease the delivery quantity of each pump per revolution in unison.

If the device of FIG. 5 is a car, the driver will control his accelerator by his foot. The car will start to run, using the fluid power portion. If the car obtains speed, the fluid power and the mechanical drive portions will act in unison, assisting each other in different and varying rates with passing of time. If the vehicle runs with considerable speed on an even highway the mechanical portion of the arrangement may take over fully all power transmission for an economic drive without losses in the fluid power transmission. If the motors in housings 311,371 are variable motors, their strokes or consumption volumes per revolution may be set to zero at high speed of the car because that would stop the revolutions of the pumps and thereby of the rotary housing 449, thereby enforcing the flow of power over the pure mechanical transmission portion. Because if the motors do not accept fluid from the pumps, the pumps will stop to run, since the blocked fluid exits keep the delivery chambers of the pumps in rest. A gradual change of the strokes of the motors from maximum to zero can handle the described action steplessly and variable.

A brake 377 may be set to stop the rotatable housing 359 at long time highway drives to completely set then the fluid transmission to rest and avoid even the losses by leakage.

It is also possible to set a direct drive from the engine to the main shaft of a car in addition to the transmission system of the invention. A clutch or other transmissions with out means is then suitable. The direct drive at the transmission of the invention at rest may be used for long time high way drives on even ground to then run the vehicle with the smallest losses.

While in FIG. 2 a fixed stroke (fixed displacement) device is illustrated, it should be understood that such a device with a fully through extending shaft 80 may also be made variable. That is shown in FIG. 6 to 8.

In FIG. 6 a portion of FIG. 2 is shown with connecting rods 74 and connecting rod ball heads 103 in the respective portion of housing 100. While in FIG. 2 the connecting rod heads 103 were fixed to permanently equal lengths of strokes per revolution, the lengthes of strokes per revolution are made variable in FIG. 6. Therefore, in FIG. 6 the bearing beds for the heads 103 of the connection rods to the pistons are provided ina varialbe piston stroke guide body 500. The connecting rod heads 103 are kept therein by the holding plate 511 which itself is kept by the snap ring 510 in the variable piston stroke guide body 500. The housing 100 contains a bearing bed body 501 whereon the piston stroke guide body 500 is pivotable borne. The bearing body may consist of two pieces 501 and 502 which may be kept together by distance rings 503 which are with their rear ends kept by the rear control body housing 98 of FIG. 2. The bearing bed body is formed with a spherial bed face like the form of the inner face of a portion of a hollow ball by a radius 516 around the center of pivotal movement, namely around the center 517. The so formed bed face is shown by 515 and thereon rests or slides the complementary formed rear outer face 521 of the piston stroke guide body 500. The guide body 500 can be pivoted by an adjustment means similar in principle to that of FIG. 3, or as will be later described.

In case of devices of FIGS. 2 or 6 the piston stroke guide body 500 must revolve in unison with the rotor and shaft 80. To secure this a revolution unisor must be set between the shaft and the stroke guide body. The revolution uniser consists in FIGS. 6 to 8 of a medial ring member 512, a pin 513 which sets it inwards to shaft 80, fingers on the mentioned ring member 512 and a respective pair of slots 507 in the piston stroke guide body 500 wherein to mentioned fingers 508 of the medial ring body 512 engage and slide or bear with their faces 509 on respective wall faces 514 of the slots 507. Clearances 518 to 520 are provided to permit adjustment of the respective portions to slight unaccuracies of machining or of running. FIG. 6 shows the medial portion seen in section of the upper arrowed line of FIG. 8, while FIGS. 7 and 8 are sections through the other of these Figures along the arrowed line in the respective other of the two Figures. In FIGS. 7 and 8 the medial arrangement is shown in the position of piston stroke "zero" (the neutral position) while in FIG. 6 the piston stroke guide body 500 is pivotedly shown in 30 degrees inclination relative to the mentioned neutral or piston stroke="zero" postion. Thereby FIG. 6 shows the position of a large piston stroke.

Any other suitable revolution uniser may be provided, but the uniser of FIGS. 6 to 8 has the great feature that proper face bearings are provided, an axial alignement is possible by using slots with therein engaging fingers of the medial ring body, proper clearances provide adaption to unaccurate runs or machinings and the device is built and designed for permission of a high torque relative between the shaft 80 and the in unison revolving piston stroke guide body. Due to the high speed between the relative to each other moving faces 515 and 521 a good lubrication, best a hydrostatic bearing, is desired and so shown in FIG. 6. The fluid pressure pockets 504 are formed in the outer portion of the piston stroke guide body and surrounded by sealing lands which extend from pockets 504 to unloading recesses 506 while the pockets 504 are supplied periodically with high pressure fluid through the passages 505 from the respective passage(s) 78 or 77 of the connectiong rods via the pistons from the cylinders as it is explained at the description of FIG. 2.

The embodiment of FIG. 6 also illustrates a novel adjustment arrangement for the control and adjustment of the piston stroke to make the device ot a variable pump or motor. The adjustment body 522 is surrounded by a bearing 525 which locates in a seat in the piston stroke guide body 500. A controller pin 524 is provided on the adjustment body 522 and extends through the slot 523 out of the housing of the pump to become connected to the adjustment arrangement in the adjustment housing or outside of the device.

A still more effective device with smaller friction is obtained if the holding body 501 with its bed face 515 is not fixed in the housing but borne on the axial thrust bearing portion and a portion of the main shaft 80. Because then the body 501 revolves with the shaft 80 and the piston stroke guide body 500 does then not need to revolve relative to the bed face 515 but only pivot therein which brings shorter lengths of movement between the relative to each other moving faces 515 and 521 per revolution of the shaft and rotor of the machine. The shorter ways of relative movements between the mentioned faces 515 and 521 reduces the friction per revolution of the shaft and rotor.

FIG. 9 shows the piston of FIG. 3 in a separated illustration. The bearing bed face 606 is shown formed by radius 392 around the swing center 393. The bigger front portion 325 is clearly shown and seen are the bigger diameter front portion 607 as well as the smaller diameter rear portion 608 of the longitudinal bore through the piston whereinto the holding pin of FIG. 11 is to be inserted. Important herein is the seat 321 between the wider front portion and the narrower rear portion of the bore. This seat serves to hold the shoulder 321 of the holding pin of FIG. 11 to prevent axial dislocation of the holding pin relative to the piston and its bore.

FIG. 10 shows a piston shoe 327 of FIG. 3 in a separated illustration. One sees clearly here that the radii 602 and 392 extend from the center 393 of the pivotal movement of the piston shoe relative to the piston. Radius 392 forms the outer face 390 which is laid onto the bed face 606 of the piston of FIG. 9 and slides and bears thereon during the pivotal movement of the shoe in the piston. Radius 602 forms the inner face 602 whereonto the face 605 of the holding pin of FIG. 11 is laid and whereon the face 605 of the holding pin bears and slides during the pivotal movement of the piston shoe relative to the piston and to the holding pin. The front face 391 forms with recess 326 the fluid pressure pocket of a hydrostatic bearing. The sealing land between "d" and "D" surrounds the fluid pressure pocket and ends in the unloading recess 328 which unloads through passage 603 to a space under substantially low or no pressure. Since the pressure drops from the diameter "d" to the diameter "D" the high pressure equivalent area is that of the diameter "dm"=(D+d)/2 if the pressure drop gradient is linear along the seal face and slide face 391. The radial outer portion of the shoe 327 forms the rear guide face 394 onto which the traction ring of FIG. 4 is led to hold the shoe on the stroke guide face of FIG. 3 and also to enforce the traction of the pistons out of the cylinders at the intake strokes of the respective pistons, as explained at the description of FIG. 3.

FIG. 11 shows the holding pin in separated illustration, wherein the smaller diameter portion and the bigger diameter portion which are separated from each other by the shoulder 321 are shown. Shown is also the longitudinal bore 320 through the entire length of the holding pin and the holding pin head 329 with face 605 of radius 605 around the center 393 of pivotal movement of the piston shoe relative to the piston. Face 605 lays in face 601 of shoe 327 and thereby holds the shoe 327 on the piston of the device.

While the unison device of FIG. 6 is satisfactory for small and medial pressures, at high pressure the torque between the shaft and the piston stroke guide body becomes so high that the device might break if the unison device of FIG. 6 is used. Therefore, FIG. 12 with cross sectional FIG. 13 show a high pressure unison device to secure the equal revolutions in unison by the shaft 80 of FIG. 2 and the variable piston stroke guide body of FIG. 6 for high pressure devices.

Figure 12:
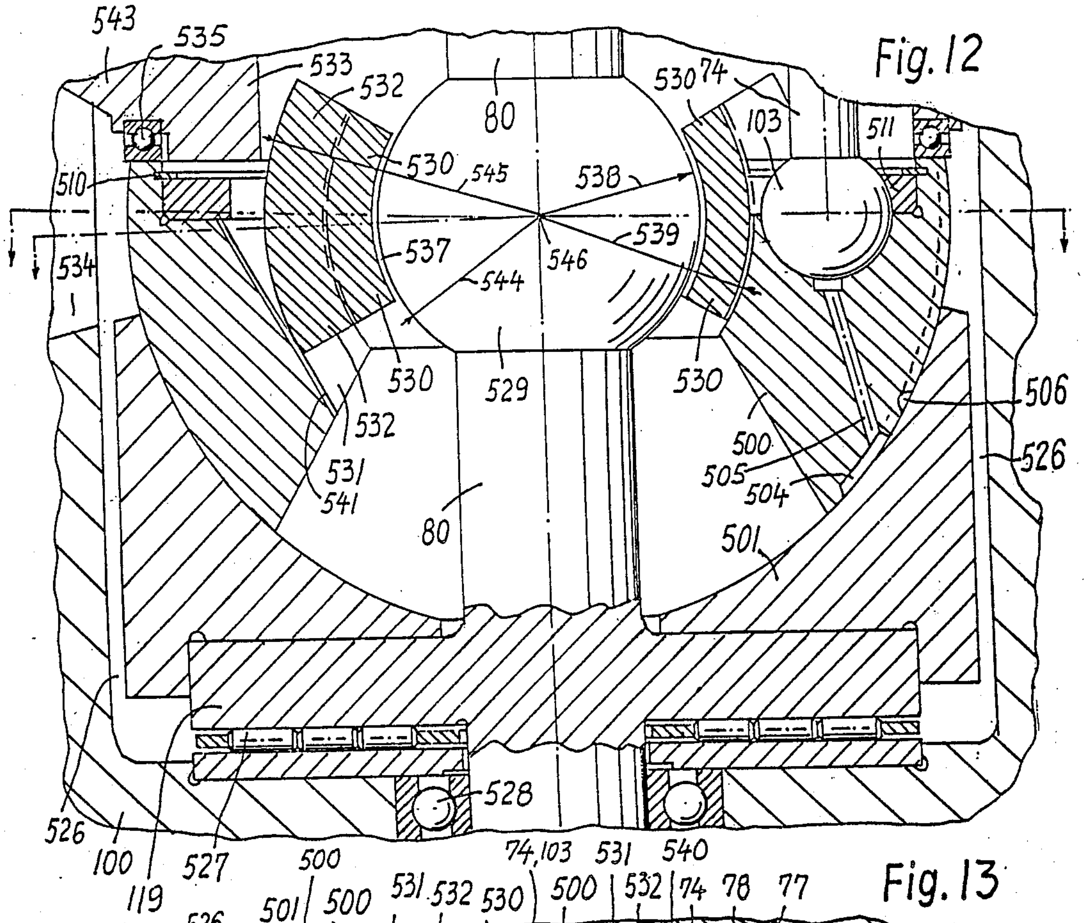
FIG. 12 is a longitudinal sectional view through a device of the invention.
Figure 13:
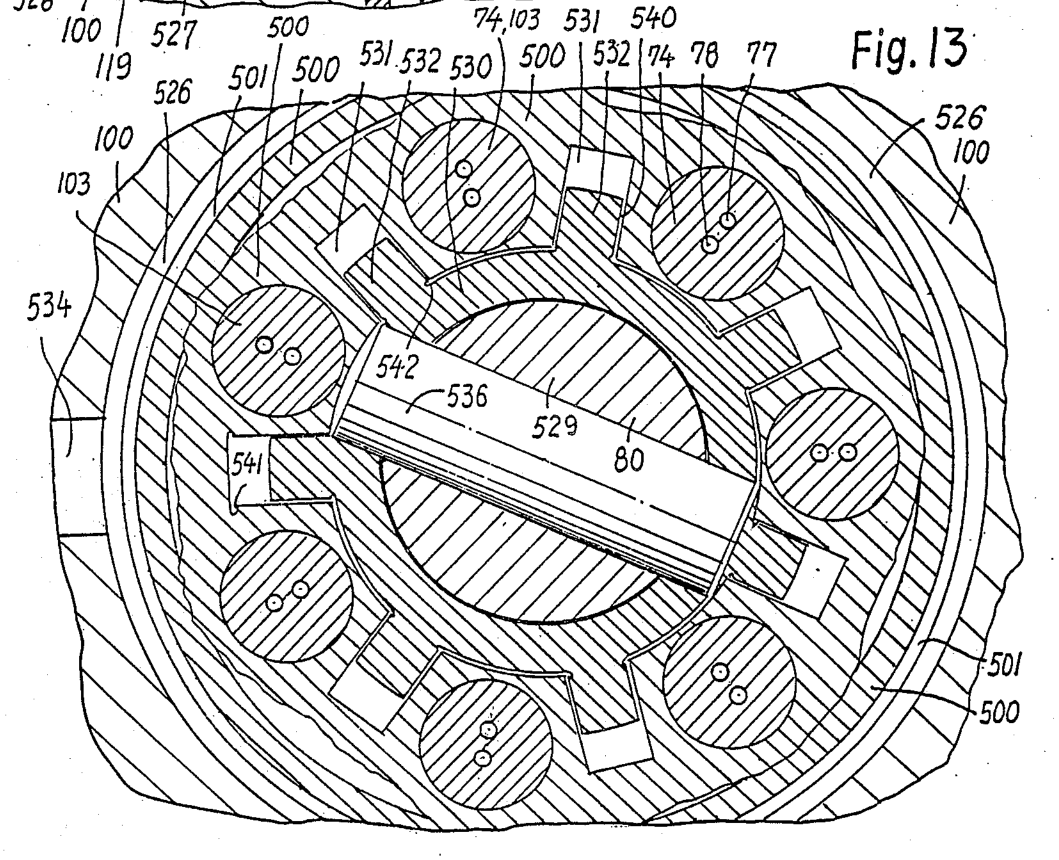
FIG. 13 is a cross sectional view through FIG. 12 along the arrowed lines of FIG. 12.

FIG. 12 shows a modification of FIGS. 2,3 and 6 for specifically high pressure and FIG. 13 is the cross sectional view through FIG. 12 along the arrowed lines of FIG. 12. The main shaft 80 is again revolvably borne in housing 100 as in FIG. 2. The axial bearing is radially widened to obtain a higher load capacity as indicated by referential 119. A strong anti friction axial baring is by referential 527 provided to let the shaft 80 revolve under high axial thrust with small friction. Bearing 528 supports and bears the main shaft 80 in radial direction. Note, that tapered roller bearings would weld under the high load. This is an experience from inventors's tests of pumps and motors. It is written nowhere, but true is that tapered roller bearings for combined axial and radial load break in pumps and motors often within a couple of hours even if they are over dimensioned. This experience has cost millions of dollars because licensed manufacturing companies changed the separated radial and axial bearings of the inventor to tapered roller bearings because they were inexpensively available since they are mass produced for cars.

The speciality of FIGS. 12 and 13 is the novel unison ring arrangement to secure the unison of the rotary running of the shaft and of the piston stroke guide body. In these Figures the piston stroke guide body 500 and the other means of the piston stroke guide arrangement are shown in the neutral position for piston stroke=zero. Shaft 80 is now provided with a big diameter ball portion 529 of diameter 544. A pin 536 is inserted through a respective bore through ball portion 529 and it is seen in FIG. 13 that this pin is a strong pin of considerable big diameter for capability of transmitting a high torque. The speed unison ring 530 is now also very strong and the strongness is obtained by the configuration of this embodiment of the invention. Speed uniser ring 530 has a part ball formed inner diameter 538 and a part ball formed outer diameter 539. Axially this ring 530 is very long in order to obtain the capability to transfer a big torque. A small clearance 537 is provided between the outer diameter 544 of the ball portion and the inner diameter of ring 530. The ring 530 is provided in this embodiment with a number of radially extending fingers 532 equal in number to the number of cylinders and connecting rods 74,103 of the device. Since this pump or motor of these Figures has 7 pistons, cylinders and connecting rods, the ring 530 has seven fingers 532. The fingers 532 extend into slots 531 which are provided in the piston stroke guide body 500. The mentioned fingers 532 have outer diameters 545. The mentioned diameters are formed around the center 546 of the ball formed portion 529. Since there is no space in the Figure to write the diameters, the radii 544,538,539 and 545 are written in FIG. 13. The slots 531 are easily machined because they are straight slots with parallel wall faces and a root face which is inclined relative to the axis of the shaft 80. The machining can be done so perfect that even undercuts 541 can be provided to obtain clear plane and parallel wall faces of the slots 531. Between the fingers 532 and the parallel faces of the walls of the slots 531 small clearances 540 may be provided. To get clear parallel faces of the fingers which transfer the torque to the wall faces of the slots 531, undercuts 542 may be provided on the roots of the fingers 532. It is seen in the FIGS. 12 and 13 that the fingers 532 and the slots 531 extend radially about over the centers of the part ball beds and connecting rod heads 103 of connecting rods 74. Thereby the capability to transfer a high torque from the shaft 80 to the piston stroke guide body 500 and vice versa is obtained.

Since the medial space is used up by the arrangement of the high pressure capable speed unison securing ring with its arrangements, there is no medial space left to set a piston stroke adjustment arrangement. The piston strok adustment arrangement is therefore in these Figures set axially on top of the piston stroke guide body 500. The stroke adjustment body 533 with its connection portion 543 is set borne by a bearing 535 onto the top face of the piston stroke guide body 500. The connection arm 543 to the stroke adjustment controller extends through the slot 534 in the housing 100 to meet the stroke adjustment controller in the stroke adjustment housing which is fastened to housing 100 but not shown in the Figures since such controllers are generally known in the art. Since the bearing bed body 501 which guides and bears the piston stroke guide body 500, is revolvably borne on the axial bearing 119 of shaft 80 to reduce friction, a big clearance 526 is provided between the outer diameter of the bed body 501 and the inner face of the housing 100. Further referential numbers which appear in FIGS. 12 and 13 are such which have been described in the Figures of which FIGS. 12 and 13 bring the improvement for high pressure.

More details of the embodiments of the invention are described partially with other words and sentences in the appended claims. The claims are therefore considered to belong to the description of the preferred embodiments of the invention.

The term "wheels" defines in the claims ground engaging means of a vehicle, such as, for example, wheels, rollers, chains, tracks and the like.

What is claimed is:

1. An axial piston device, comprising, in combination, a rotor revolvably borne in a housing with cylinders provided axially in said rotor to contain in the cylinders reciprocable pistons, inlet ports and outlet ports for flow of fluid into and out of said cylinders, a piston stroke guide means to guide said pistons in reciprocating piston strokes in said cylinders and an improvement.

wherein said improvement comprises, in combination, an axial thrust bearing provided on a shaft in said housing, said rotor radially borne on said shaft, a shoulder provided on said shaft and a front seat provided on said rotor to axially bear on said shoulder of said shaft,
a rear end face provided on said rotor and a thrust member provided in a housing portion and subjected to high pressure fluid in a thrust chamber on the rear of said thrust member while said thrust member has a front face,
whereby said high pressure fluid in said thrust chamber presses said thrust member towards
said rotor to engage with said front face against said rear end face
and said front seat against said shoulder while said shaft is pressed by the load on said shoulder onto said axial thrust bearing,
wherein said shaft extends axially through said device,
wherein a bore is concentrically provided in said shaft to extend through
said shaft, and, wherein an independent shaft is extended through said bore in said
shaft with the ability to move independently of said shaft with said bore.

2. The device of claim 1,
wherein said independent shaft has on one end of its shaft a seat to fasten thereon a first gear,
wherein said housing carries a gear housing with a therein revolvable housing which is borne in bearings in said gear housing,
wherein said revolvable housing is provided with in said revolvable housing revolvable second and third gears which revolve in unison if they revolve,
wherein an outgoing shaft is revolvably borne in said gear housing to carry on its inner end inside of said gear housing and inside of said revolvable housing a fourth gear,
wherein said first gear meshes with its teeth into the teeth of said second gear while the teeth of said third gear mesh into the teeth of said fourth gear, and,
wherein said shaft which is provided with said bore is in its outer end, which is located outwards of said housing but inside of said gear housing, is connected to said revolvable gear housing to revolve with proportionate rotary velocity relative to said revolvable gear housing.

3. The device of claim 1,
wherein a power plant is provided with a gear housing,
wherein said gear housing has in its inside a gears holding revolvable housing which carries revolvable second and third gears which revolve in unison while said revolvable housing is fastened to said shaft which bears said rotor,
wherein an outgoing shaft is revolvable provided in said gear housing with a fourth gear on said outgoing shaft which meshes with its teeth into the teeth of said third gear, while the teeth of said second gear mesh into the teeth of a first gear,
wherein a power output shaft of said power plant is connected to said first gear to revolve with proportionate rotary velocity in unison with said first gear,
wherein an outer gear is provided on said revolvable housing,
wherein fluid flow supply devices are provided with power intake gears on their respective shafts,
wherein the teeth of said power intake gears mesh with the teeth of said outer gear of said revolvable housing, and;
wherein said fluid flow devices supply fluid to a number of said axial piston devices.

4. The axial piston device of claim 3,
wherein a vehicle is provided with said power plant and a plurality of wheels,
wherein said fluid flow producing means have a number of fluid flow outlets of variable quantity of fluid,
wherein means are provided to equalize said quantities of said outlets of all of said fluid flow producing devices,
wherein said wheels are connected to drive shafts from transmissions which have in addition to said first to fourth gears an eighth gear on a drive shaft driven by a seventh gear which revolves in unision with a sixth gear which is driven by a fifth gear with said fifth gear connected to an independent shaft which extends through a main shaft of the respective fluid motor while said main shaft is connected to a rotatable housing which revolvably bears said sixth and seventh gears,
wherein each of said motors has an inlet and an outlet port,
wherein each of said fluid flow producing devices has an inlet and an outlet, and,
wherein said outlet of the respective fluid flow producing device is communicated by a fluid line to said inlet port of said fluid motor with another fluid line between the other two ports of said fluid flow producing device and said respective motor,
while every of said fluid flow producing devices is similarly communicated by such two fluid lines to said ports of a respective individual fluid motor,
whereby all of said fluid motors of said vehicle are forced to revolve with proportionate rotary velocities relative to each other when said fluid flow producing devices supply high pressure fluid to said fluid motors.

5. The axial piston device of claim 4,
wherein said outgoing shaft is geared to a mechanical power transfer shaft which is revolvably borne in said vehicle, and,
wherein said independent shafts of said fluid motors are geared to said mechanic power transfer shaft,
whereby said vehicle is selectively driven by three types of power transfer means, whereof the first transfer means in the transfer of the power output of said power plant through the fluid flow producing devices and said fluid motors to said wheels, the second transfer means is the transfer of the output power of said power plant pure mechanically over said mechanical power shaft and said independent shafts through said fluid motors to said rotors (wheels), and the third transfer means is a combined transfer with a portion of said output of said power plant transferred over said fluid flow producing means with said fluid motors in combination with the transfer of another portion of said power output over said mechanical power shaft and said independent shafts to said wheels.

6. An axial piston device, comprising, in combination,
a rotor revolvably borne in a housing with cylinders provided axially in said rotor to contain in the cylinders reciprocable pistons, inlet ports and outlet ports for flow of fluid into and out of said cylinders, a piston stroke guide means to guide said pistons in reciprocating piston strokes in said cylinders and an improvement, wherein said improvement comprises, in combination, an axial thrust bearing provided on a shaft in said housing, said rotor radially borne on said shaft, a shoulder provided on said shaft and a front seat provided on said rotor to axially bear on said shoulder of said shaft, a rear end face provided on said rotor and a thrust member provided in a housing portion and subjected to high pressure fluid in a thrust chamber on the rear of said thrust member while said thrust member has a front face, whereby said high pressure fluid in said thrust chamber presses said thrust member towards said rotor to engage with said face against said rear end face and said front seat against said shoulder while said shaft is pressed by the load on said shoulder onto said axial thrust bearing, wherein said shaft extends through a bore in said thrust member, wherein said piston stroke guide means is provided with a planar piston stroke guide face, said pistons have bed faces to bear pivotably thereon piston shoes with front faces for sliding of said front faces along said guide face, wherein said thrust member is a control body with ports which align to said cylinders, whereby said high pressure fluid passes in the high pressure half of a revolution of said rotor against the rear ends of said pistons to press said pistons with said bed bace against the rear faces of said pistons shoes and said front faces of said piston shoes against said piston stroke guide face, wherein said piston shoes are provided with a frontwards open recess which forms a part ball configurated inner face and a rearward open recess which extends from said inner face to and through the rear end of said piston shoes, wherein said pistons are provided with a longitudinal bore with a front portion and a rearwards portion with said front portion forming a holding seat, and, wherein a holding pin is inserted through said recesses in said piston shoes into said bore(s) in said pistons with said holding pin forming a holding head with a rear face to meet said inner face of said piston shoes, whereby said holding pin holds said pistons and piston shoes together, while it enables a pivotal movement of said piston shoes relative to said pistons, and;

wherein fluid is led along said pin into said frontwards open recess while a rear shoulder on said pin meets a shoulder of said bore(s) to define and maintain the closeness of said shoe to said piston to permit a pivotal movement of said shoe on said piston but seal against escape of leakage between said piston shoe and said piston.

* * * * *